United States Patent
Mori et al.

(10) Patent No.: US 11,746,237 B2
(45) Date of Patent: Sep. 5, 2023

(54) ORGANOSILOXANE COMPOUND AND SURFACE TREATMENT AGENT

(71) Applicant: SHIN-ETSU CHEMICAL CO., LTD., Tokyo (JP)

(72) Inventors: Seiya Mori, Annaka (JP); Ryusuke Sakoh, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 404 days.

(21) Appl. No.: 16/969,435

(22) PCT Filed: Nov. 22, 2018

(86) PCT No.: PCT/JP2018/043246
§ 371 (c)(1),
(2) Date: Aug. 12, 2020

(87) PCT Pub. No.: WO2019/159476
PCT Pub. Date: Aug. 22, 2019

(65) Prior Publication Data
US 2020/0369887 A1 Nov. 26, 2020

(30) Foreign Application Priority Data
Feb. 13, 2018 (JP) ................................. 2018-023092

(51) Int. Cl.
*C08G 77/12* (2006.01)
*C08L 83/06* (2006.01)
*C08G 77/04* (2006.01)
*C08G 77/18* (2006.01)
*C08G 77/20* (2006.01)

(52) U.S. Cl.
CPC ............ *C08L 83/06* (2013.01); *C08G 77/045* (2013.01); *C08G 77/12* (2013.01); *C08G 77/18* (2013.01); *C08G 77/20* (2013.01)

(58) Field of Classification Search
CPC ..... C08G 77/12; C08G 77/045; C08K 5/5425
See application file for complete search history.

(56) References Cited

U.S. PATENT DOCUMENTS

| | | | |
|---|---|---|---|
| 2007/0290202 | A1 | 12/2007 | Matsumoto et al. |
| 2007/0293624 | A1* | 12/2007 | Matsumoto ......... H01L 23/3737 524/588 |
| 2008/0114182 | A1 | 5/2008 | Sakamoto et al. |
| 2009/0208728 | A1 | 8/2009 | Itami et al. |
| 2009/0216035 | A1 | 8/2009 | Itami et al. |
| 2012/0077041 | A1 | 3/2012 | Yamane et al. |
| 2013/0136928 | A1 | 5/2013 | Yamane et al. |
| 2013/0303689 | A1 | 11/2013 | Sato et al. |
| 2015/0274889 | A1 | 10/2015 | Sakoh et al. |

FOREIGN PATENT DOCUMENTS

| | | | |
|---|---|---|---|
| JP | 9-157543 | A | 6/1997 |
| JP | 2000256374 | * | 9/2000 |
| JP | 2001-353808 | A | 12/2001 |
| JP | 2007-332104 | A | 12/2007 |
| JP | 2008-120735 | A | 5/2008 |
| JP | 2008-534696 | A | 8/2008 |
| JP | 2008-537557 | A | 9/2008 |
| JP | 2012-72272 | A | 4/2012 |
| JP | 2012-157856 | A | 8/2012 |
| JP | 2013-136833 | A | 7/2013 |
| JP | 2013-166716 | A | 8/2013 |
| JP | 2015-91763 | A | 5/2015 |
| JP | 2015-199906 | A | 11/2015 |
| JP | 2016-155771 | A | 9/2016 |
| WO | WO 2018/008505 | A1 | 1/2018 |
| WO | WO 2019/082583 | A1 | 5/2019 |

OTHER PUBLICATIONS

JP 2000 256374 machine translation (2000).*
International Search Report (PCT/ISA/210) issued in PCT/JP2018/043246, dated Feb. 5, 2019.
Written Opinion of the International Searching Authority (PCT/ISA/237) issued in PCT/JP2018/043246, dated Feb. 5, 2019.

* cited by examiner

*Primary Examiner* — Kuo Liang Peng
(74) *Attorney, Agent, or Firm* — Birch, Stewart, Kolasch & Birch, LLP

(57) ABSTRACT

Provided are: a (hydrolyzable) organosiloxane compound which is represented by general formula (1) and contains a lipophilic group capable of forming a cured film having excellent lipophilicity and wear resistance; and a surface treatment agent containing the compound.

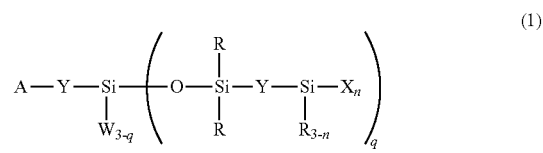

(1)

(In the formula, A is any one among $-CH_3$, $-C(=O)OR^1$, $-C(=O)NR^1_2$, $-C(=O)SR^1$, and $-P(=O)(OR^1)_2$; $R^1$ is a hydrogen atom, a C1-30 alkyl group, a C6-30 aryl group, or a C7-30 aralkyl group; Y is independently a divalent organic group; W is independently a C1-4 alkyl group, a phenyl group, a hydroxyl group, or a hydrolyzable group; R is independently a C1-4 alkyl group or a phenyl group; X is independently a hydroxyl group or a hydrolyzable group; n is an integer of 1-3; and q is an integer of 1-3.)

5 Claims, No Drawings

ORGANOSILOXANE COMPOUND AND SURFACE TREATMENT AGENT

TECHNICAL FIELD

This invention relates to an organosiloxane compound having a hydroxyl or hydrolyzable group and a lipophilic group in the molecule. More particularly, it relates to a (hydrolyzable) organosiloxane compound containing a lipophilic group and capable of forming a coating having lipophilicity and abrasion resistance, and a surface treating agent comprising the compound.

BACKGROUND ART

Recently, there is an accelerating demand to mount touch panels on mobile phones and other displays. Because of manipulation by touching with the finger, fingerprints and stains deposit on the touch panels, which look dirty or indistinct. There is an annually increasing need for the technology of preventing fingerprints from depositing on a display surface or making fingerprints inconspicuous for better appearance or visibility. It is thus desired to have a material capable of meeting these requirements.

In general, silane coupling agents are well known as a surface modifier for glass and fabric substrates. They are widely used as surface coating agents for numerous substrates. The silane coupling agent contains an organic functional group and a reactive silyl group (typically hydrolyzable silyl such as alkoxysilyl) in the molecule. In the presence of airborne moisture or the like, the hydrolyzable silyl groups undergo self-condensation reaction to form a coating. Since the hydrolyzable silyl groups form chemical and physical bonds with the surface of glass or metal, the coating becomes a tough coating having durability.

Patent Documents 1 to 6 (JP-A 2008-534696, JP-A 2008-537557, JP-A 2012-072272, JP-A 2012-157856, JP-A 2013-136833, JP-A 2015-199906) disclose many compositions comprising a fluoropolyether-containing polymer which is obtained by introducing a hydrolyzable silyl group into a fluoropolyether-containing compound, the composition being able to form a coating with water/oil repellency, antifouling and other properties on the substrate surface.

Although the conventional coating layer formed using a fluoropolyether-containing polymer is oil/water repellent and easy to wipe off stains, there is one problem that the coating surface repels the sebum in fingerprints into microscopic droplets, which scatter light, so that the fingerprints look conspicuous.

Also, Patent Document 7 (JP-A 2001-353808) discloses a composition comprising a silane compound obtained by introducing a hydrolyzable silyl group into a lipophilic compound, the composition being tightly adherent to a substrate surface and forming a lipophilic coating thereon.

However, a coating of the silane compound described in Patent Document 7 does not have practically satisfactory low-fingerprint-visibility because it takes several days until fingerprints become substantially inconspicuous.

PRIOR ART DOCUMENTS

Patent Documents

Patent Document 1: JP-A 2008-534696
Patent Document 2: JP-A 2008-537557
Patent Document 3: JP-A 2012-072272
Patent Document 4: JP-A 2012-157856
Patent Document 5: JP-A 2013-136833
Patent Document 6: JP-A 2015-199906
Patent Document 7: JP-A 2001-353808

SUMMARY OF INVENTION

Technical Problem

An object of the invention, which has been made under the above-mentioned circumstances, is to provide a (hydrolyzable) organosiloxane compound containing a lipophilic group and capable of forming a coating having lipophilicity and abrasion resistance, and a surface treating agent comprising the compound.

To attain the above object, the inventors proposed in Japanese Patent Application No. 2017-206986 a surface treating agent comprising a silane compound obtained by introducing a hydrolyzable silyl group into a lipophilic compound, the agent being tightly adherent to a substrate surface and forming a lipophilic coating thereon. Although the silane compound achieves excellent low-fingerprint-visibility in that it forms a cured coating having a refractive index close to the refractive index (~1.5) of sebum, the coating will lose low-fingerprint-visibility as a result of abrasion during service.

Making further investigations, the inventors have found that a (hydrolyzable) organosiloxane compound having at one end a plurality of hydrolyzable silyl groups branching from a silicon atom at an intermediate linking site via a siloxane bond, preferably via a plurality of silicon atoms, as represented by the general formula (1) below, is effective as the (hydrolyzable) organosiloxane compound containing a lipophilic group, because this (hydrolyzable) organosiloxane compound is able to form a cured coating having lipophilicity and abrasion resistance. The present invention is predicated on this finding.

Accordingly, the invention provides an organosiloxane compound and a surface treating agent, as defined below.

[1]
An organosiloxane compound having the general formula (1):

[Chem. 1]

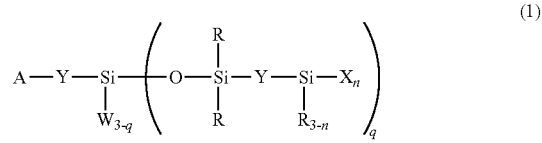

wherein A is $-CH_3$, $-C(=O)OR^1$, $-C(=O)NR^1_2$, $-C(=O)SR^1$, or $-P(=O^1)(OR^1)_2$, $R^1$ is hydrogen, a $C_1$-$C_{30}$ alkyl group, $C_6$-$C_{30}$ aryl group, or $C_7$-$C_{30}$ aralkyl group, Y is independently a divalent organic group, W is independently a $C_1$-$C_4$ alkyl group, phenyl group, hydroxyl group or hydrolyzable group. R is independently a $C_1$-$C_4$ alkyl group or phenyl group, X is independently a hydroxyl group or hydrolyzable group, n is an integer of 1 to 3, and q is an integer of 1 to 3.

[2]
The organosiloxane compound of [1] wherein in formula (1), Y is a $C_2$-$C_3$ alkylene group which may contain a divalent group selected from among $-O-$, $-S-$, $-NR-$, $-C(=O)-$, $-C(=O)O-$, $-C(=O)NR-$, $-OC(=O)NR-$, silalkylene, silarylene, and straight, branched or cyclic divalent organopolysiloxane residues of 2 to 10 silicon atoms, wherein R is $C_1$-$C_4$ alkyl or phenyl, and which may contain $C_6$-$C_{20}$ arylene.

[3]

The organosiloxane compound of [1] or [2] wherein in formula (1), W is independently selected from the group consisting of $C_1$-$C_4$ alkyl, phenyl, hydroxyl, $C_1$-$C_{10}$ alkoxy, $C_2$-$C_{10}$ alkoxy-substituted alkoxy, $C_1$-$C_{10}$ acyloxy, $C_2$-$C_{10}$ alkenyloxy, halogen, oxime, isocyanate, and cyanate.

[4]

The organosiloxane compound of [1], having the general formula (2):

[Chem. 2]

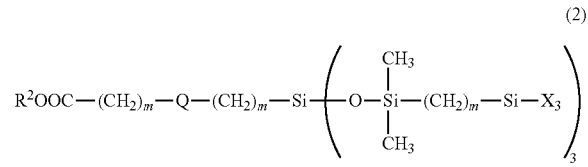

(2)

wherein $R^2$ is a $C_1$-$C_{20}$ alkyl group, $C_6$-$C_{20}$ aryl group or $C_7$-$C_{20}$ aralkyl group, Q is a single bond or a divalent group selected from among silalkylene, silarylene, and straight, branched or cyclic divalent organopolysiloxane residues of 2 to 10 silicon atoms, m is each independently an integer of 1 to 20, and X is independently a hydroxyl group or hydrolyzable group.

[5]

The organosiloxane compound of any one of [1] to [4] wherein in formula (1) or (2), X is each independently selected from the group consisting of hydroxyl, $C_1$-$C_{10}$ alkoxy, $C_2$-$C_{10}$ alkoxy-substituted alkoxy, $C_1$-$C_{10}$ acyloxy, $C_2$-$C_{10}$ alkenyloxy, halogen, oxime, isocyanate, and cyanate.

[6]

A surface treating agent comprising the organosiloxane compound of any one of [1] to [5].

Advantageous Effects of Invention

The (hydrolyzable) organosiloxane compound containing a lipophilic group according to the invention functions, if sebum is deposited thereon, to wet and spread the sebum over the substrate by virtue of the lipophilic terminal group in the molecule. The organosiloxane compound is effective in reducing friction by virtue of a flexible siloxane skeleton in the molecule. The organosiloxane compound tightly bonds to glass or metal surface because it contains a plurality of silanol or hydrolyzable silyl groups. Thus the (hydrolyzable) organosiloxane compound is able to form a cured coating having excellent low-fingerprint-visibility and abrasion resistance.

DESCRIPTION OF EMBODIMENTS

The invention provides a (hydrolyzable) organosiloxane compound containing a lipophilic group in the molecule, which has the general formula (1). A mixture of such organosiloxane compounds is also contemplated.

[Chem. 3]

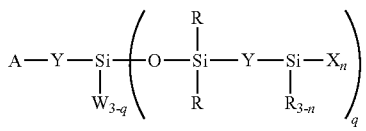

(1)

Herein "A" is —$CH_3$, —$C(\!=\!O)OR^1$. —$C(\!=\!O)NR^1{}_2$. —$C(\!=\!O)SR^1$, or —$P(\!=\!O)(OR^1)_2$, wherein $R^1$ is hydrogen, a $C_1$-$C_{30}$ alkyl group, $C_6$-$C_{30}$ aryl group, or $C_7$-$C_{30}$ aralkyl group. Y is independently a divalent organic group, W is independently a $C_1$-$C_4$ alkyl group, phenyl group, hydroxyl group or hydrolyzable group, R is independently a $C_1$-$C_4$ alkyl group or phenyl group. X is independently a hydroxyl group or hydrolyzable group, n is an integer of 1 to 3, and q is an integer of 1 to 3.

The lipophilic group-containing (hydrolyzable) organosiloxane compound of the invention has a lipophilic terminal group, a siloxane skeleton, and preferably a plurality of (i.e., two or more), more preferably 2 to 9, even more preferably 3 to 9 silanol groups, or at least one, preferably 2 or 3, more preferably 3 hydrolyzable silyl groups (i.e., silyl groups each independently having 1 to 3, preferably 2 or 3 hydrolyzable groups) and is characterized by excellent lipophilicity and abrasion resistance.

In formula (1), "A" is —$CH_3$, a carboxylate or carboxylic acid of the formula: —$C(\!=\!O)OR^1$, amide of the formula: —$C(\!=\!O)NR^1{}_2$, thio-ester or thio-acid of the formula: —$C(\!=\!O)SR^1$, or phosphonate or phosphonic acid of the formula: —$P(\!=\!O)(OR^1)_2$, that is, a lipophilic terminal group characteristic of the invention.

Herein, $R^1$ is hydrogen, a $C_1$-$C_{30}$ alkyl group, $C_6$-$C_{30}$ aryl group or $C_7$-$C_{30}$ aralkyl group. The alkyl group may be straight, branched or cyclic, or a combination thereof. It is preferably a $C_1$-$C_8$ straight alkyl group, more preferably $C_2$-$C_4$ straight alkyl group.

Examples of $R^1$ include hydrogen, alkyl groups such as methyl, ethyl, propyl, butyl, pentyl, hexyl, heptyl, octyl, nonyl, decyl, dodecyl, tetradecyl, hexadecyl, octadecyl, isopropyl, isobutyl, tert-butyl, neopentyl, thexyl, cyclopentyl, cyclohexyl, cycloheptyl, cyclohexylmethyl, norbornyl, decahydronaphthyl, adamantyl, and adamantylmethyl, aryl groups such as phenyl, tolyl, and naphthyl, and aralkyl groups such as benzyl, phenylethyl, and phenylpropyl. $R^1$ is preferably ethyl or octyl.

Examples of "A" in addition to —$CH_3$ are shown below.

[Chem. 4]

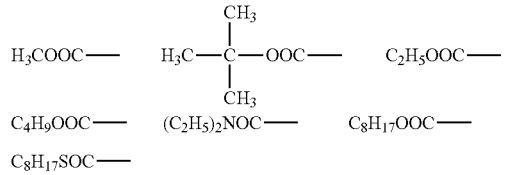

[Chem. 5]

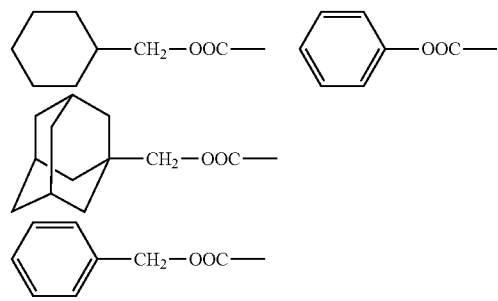

In formula (1), W which may be different from each other is a $C_1$-$C_4$ alkyl group, phenyl group, hydroxyl or hydrolyzable group. Examples of W include alkyl groups such as methyl, ethyl, propyl and butyl, phenyl, hydroxyl, $C_1$-$C_{10}$ alkoxy groups such as methoxy, ethoxy, propoxy, isopropoxy, and butoxy, $C_2$-$C_{10}$ alkoxy-substituted alkoxy groups such as methoxymethoxy and methoxyethoxy, $C_1$-$C_{10}$ acyloxy groups such as acetoxy, $C_2$-$C_{10}$ alkenyloxy groups such as isopropenoxy, halogen atoms such as fluorine, chlorine, bromine and iodine, oxime, isocyanate, and cyanate. Inter alia, methoxy, ethoxy, isopropenoxy and chlorine are preferred.

In formula (1). X which may be different from each other is a hydroxyl group or hydrolyzable group. Examples of X include hydroxyl, $C_1$-$C_{10}$ alkoxy groups such as methoxy, ethoxy, propoxy, isopropoxy, and butoxy, $C_2$-$C_{10}$ alkoxy-substituted alkoxy groups such as methoxymethoxy and methoxyethoxy, $C_1$-$C_{10}$ acyloxy groups such as acetoxy. $C_2$-$C_{10}$ alkenyloxy groups such as isopropenoxy, halogen atoms such as fluorine, chlorine, bromine and iodine, oxime, isocyanate, and cyanate. Inter alia, methoxy, ethoxy, isopropenoxy and chlorine are preferred.

In formula (1), R is a $C_1$-$C_4$ alkyl group such as methyl, ethyl, propyl, isopropyl, butyl, isobutyl, sec-butyl, or tert-butyl, or phenyl, with methyl being preferred.

In formula (1). Y is a divalent organic group, preferably a $C_2$-$C_{30}$, especially $C_2$-$C_{20}$ alkylene group which may contain a divalent group selected from among —O—, —S—. —NR—, —C(=O)—, —C(=O)O—, —C(=O)NR—, —OC(=O)NR—, silalkylene group, silarylene group, and straight, branched or cyclic divalent organopolysiloxane residues of 2 to 10 silicon atoms, wherein R is as defined above, and which may contain a $C_6$-$C_{20}$ arylene group. More preferably Y is a divalent group having the formula (3).

[Chem. 6]

(3)

In formula (3), $R^3$ is independently a divalent hydrocarbon group. Examples include $C_1$-$C_{30}$ alkylene groups such as methylene, ethylene, propylene, butylene and hexamethylene, and $C_7$-$C_{30}$ alkylene groups containing a $C_1$-$C_{20}$ arylene group such as phenylene, with $C_2$-$C_{20}$ alkylene groups being preferred.

In formula (3). Z is a single bond, or a divalent group selected from among —O—, —S—, —NR—, —C(=O)—, —C(=O)O—. —C(=O)NR—, —OC(=O)NR—, silalkylene group, silarylene group, and straight, branched or cyclic divalent organopolysiloxane residues of 2 to 10 silicon atoms, preferably 2 to 5 silicon atoms, wherein R is as defined above.

Examples of the silalkylene and silarylene groups are shown by the following formula.

[Chem. 7]

Herein $R^4$ which may be the same or different is a $C_1$-$C_4$ alkyl group such as methyl, ethyl, propyl or butyl, or $C_6$-$C_{10}$ aryl group such as phenyl. $R^5$ is a $C_1$-$C_{12}$, preferably $C_2$-$C_8$ alkylene group such as methylene, ethylene, propylene (trimethylene or methylethylene), butylene (tetramethylene or methylpropylene), pentylene (pentamethylene), hexylene (hexamethylene), heptylene (heptamethylene), octylene (octamethylene or ethylhexylene), decamethylene, undecamethylene or dodecamethylene, or $C_6$-$C_{12}$ arylene group such as phenylene.

Examples of the straight, branched or cyclic divalent organopolysiloxane residue of 2 to 10 silicon atoms, preferably 2 to 5 silicon atoms are shown by the following formulae.

[Chem. 8]

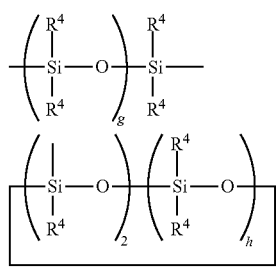

Herein $R^4$ is as defined above, g is an integer of 1 to 9, preferably 1 to 4, and h is an integer of 1 to 8, preferably 1 to 3.

In formula (3), "a" is 0 or 1.

Exemplary of Y are the following groups.

[Chem. 9]

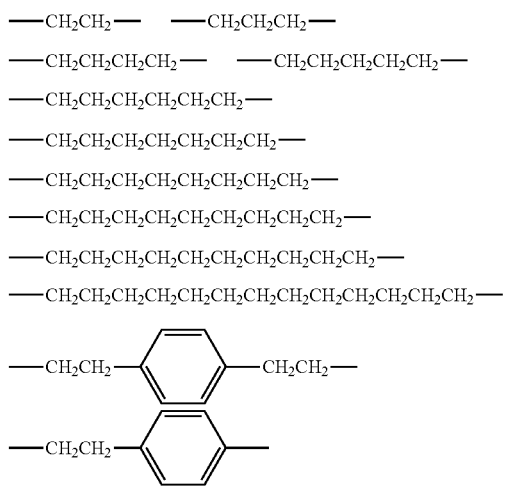

[Chem. 10]

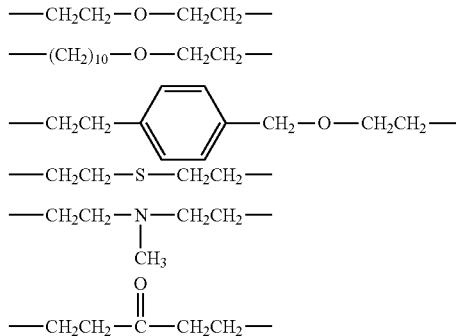

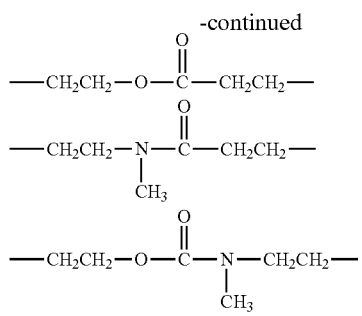
[Chem. 11]
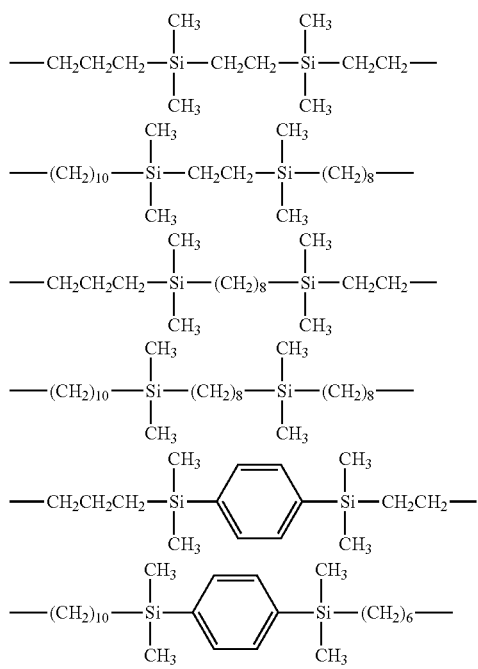
[Chem. 14]
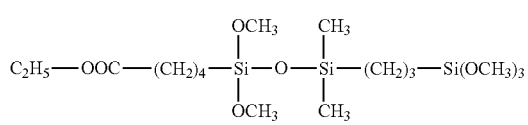
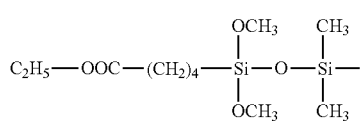
[Chem. 12]
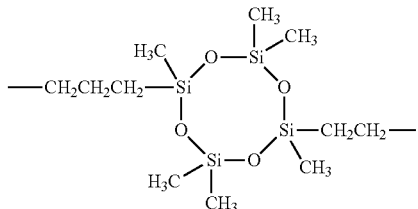
[Chem. 13]
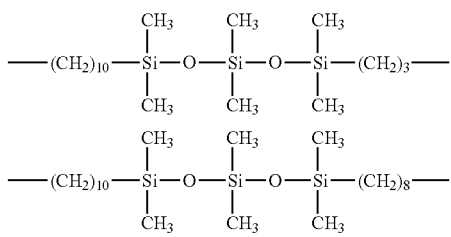
In formula (1), n is an integer of 1 to 3, and q is an integer of 1 to 3. Preferably n is 2 or 3, and q is 2 or 3. More preferably n is 3 and q is 3.
Exemplary of the lipophilic group-containing (hydrolyzable) organosiloxane compound having formula (1) are compounds of the following formulae.
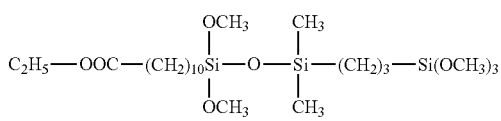
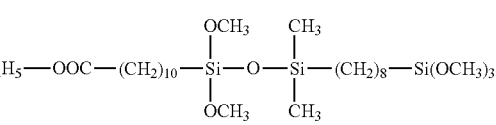
[Chem. 15]
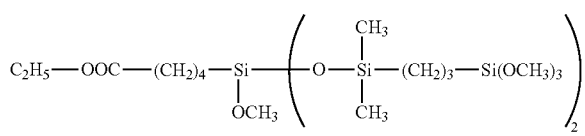
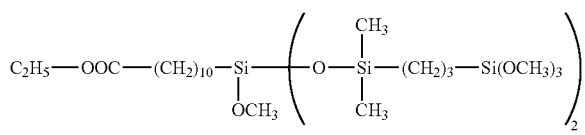

-continued
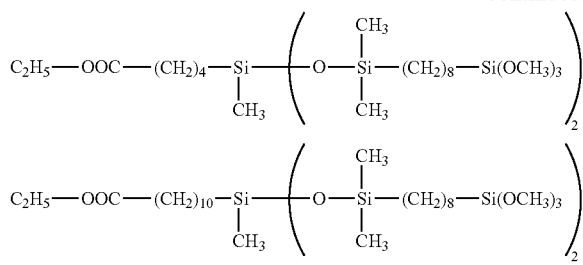
[Chem. 16]
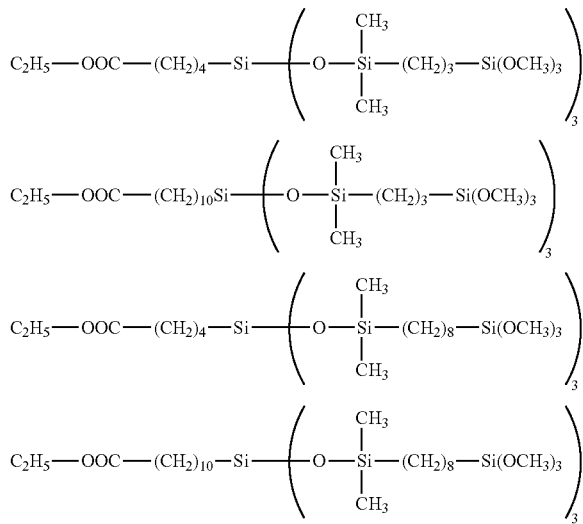
[Chem. 17]
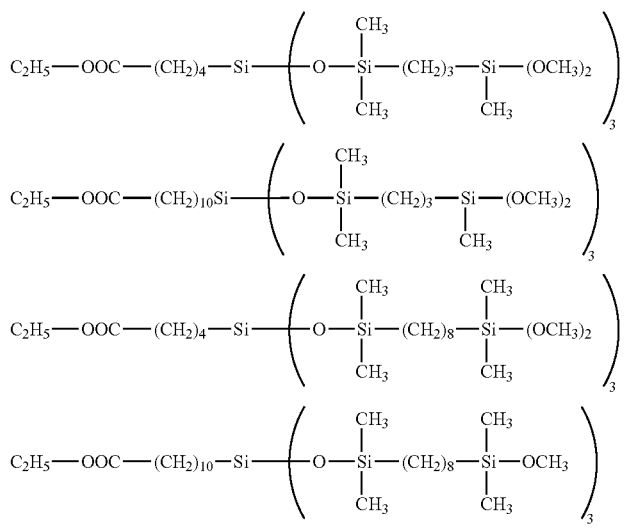
[Chem. 18]
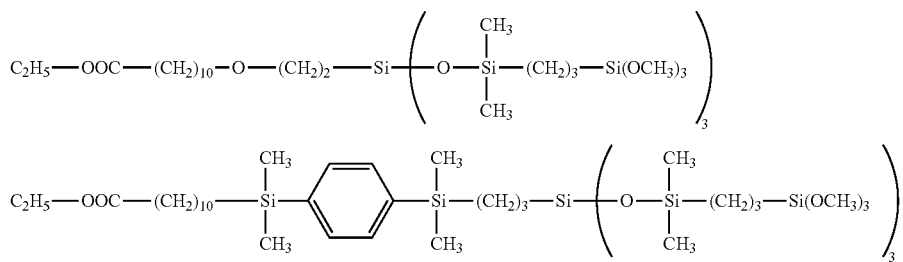

-continued
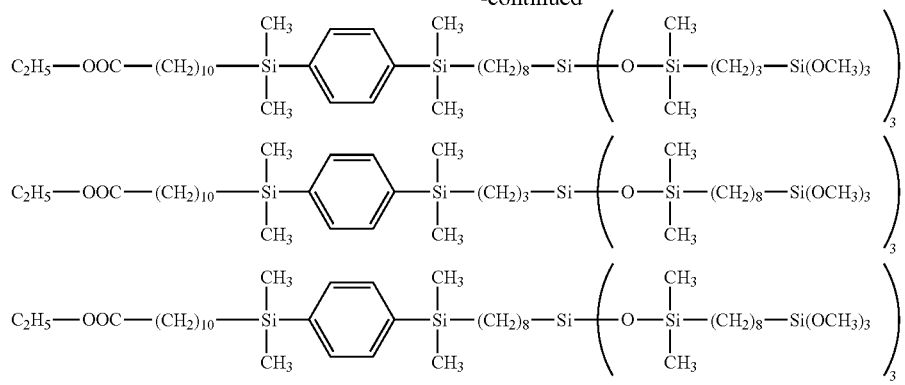
[Chem. 19]
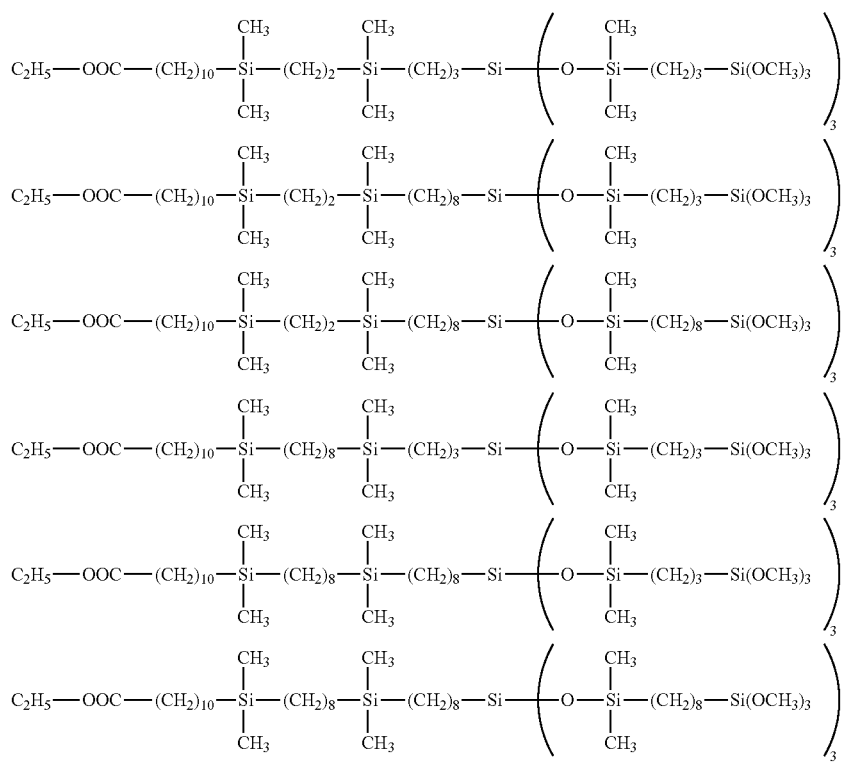
[Chem. 20]
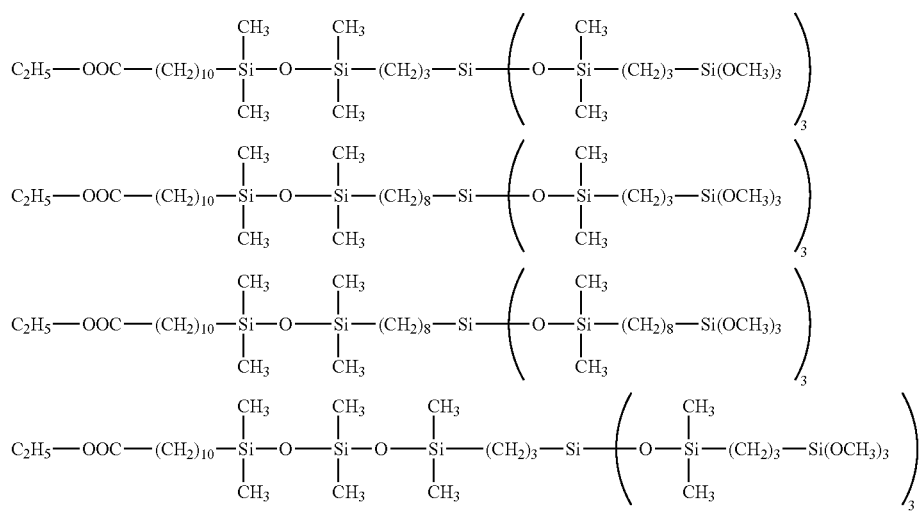

-continued
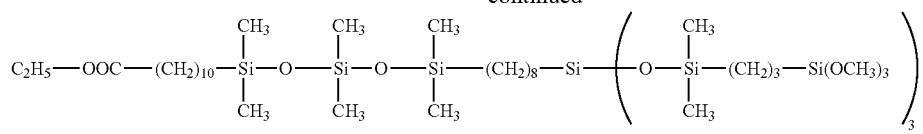
[Chem. 21]
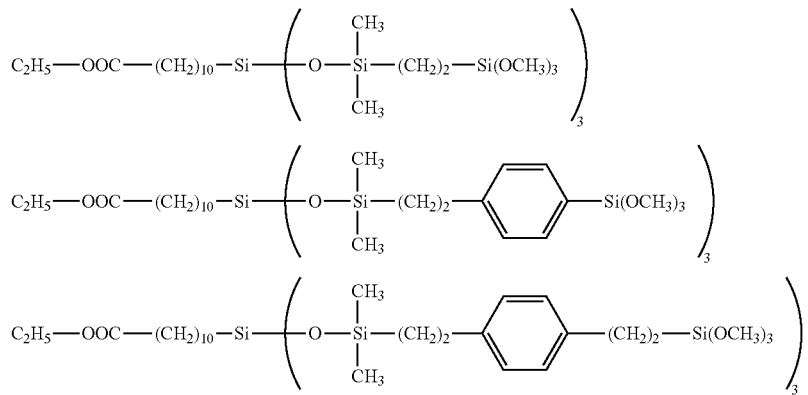
[Chem. 22]
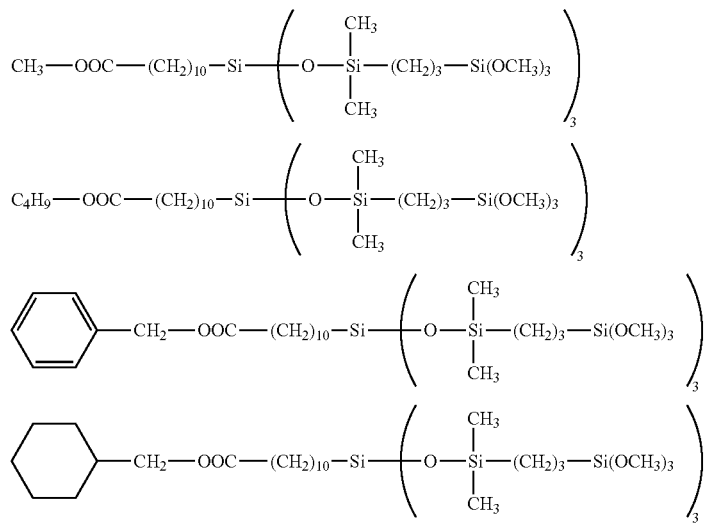
[Chem. 23]
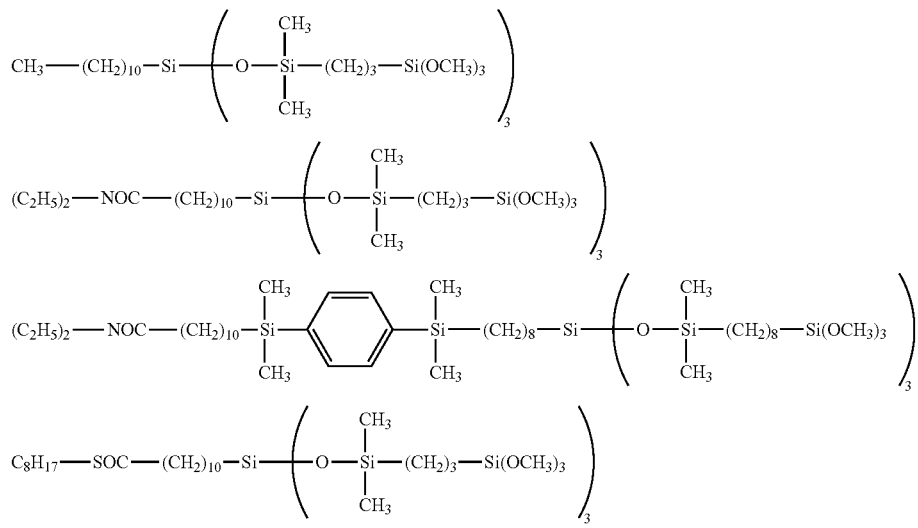

Of the lipophilic group-containing (hydrolyzable) organosiloxane compounds, compounds having the general formula (2) are more preferred.

[Chem. 24]

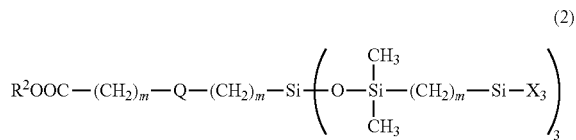
(2)

Herein $R^2$ is a $C_1$-$C_{20}$ alkyl group, $C_6$-$C_{20}$ aryl group or $C_7$-$C_{20}$ aralkyl group, Q is a single bond or a divalent group selected from among silalkylene, silarylene, and straight, branched or cyclic divalent organopolysiloxane residues of 2 to 10 silicon atoms, m is each independently an integer of 1 to 20, preferably 2 to 10, and X is as defined above.

In formula (2), $R^2$ is a $C_1$-$C_{20}$ alkyl group, $C_6$-$C_{20}$ aryl group or $C_7$-$C_{20}$ aralkyl group, preferably $C_1$-$C_8$ straight alkyl group.

Examples of $R^2$ include alkyl groups such as methyl, ethyl, propyl, butyl, pentyl, hexyl, heptyl, octyl, nonyl, decyl, dodecyl, tetradecyl, hexadecyl, octadecyl, isopropyl, isobutyl, tert-butyl, neopentyl, thexyl, cyclopentyl, cyclohexyl, cycloheptyl, cyclohexylmethyl, norbornyl, decahydronaphthyl, adamantyl, and adamantylmethyl; aryl groups such as phenyl, tolyl, and naphthyl; and aralkyl groups such as benzyl, phenylethyl, and phenylpropyl. $R^2$ is preferably methyl, ethyl, butyl or octyl.

In formula (2), Q is a single bond or a divalent group selected from among silalkylene, silarylene, and straight, branched or cyclic divalent organopolysiloxane residues of 2 to 10 silicon atoms, preferably 2 to 5 silicon atoms.

Examples of the silalkylene, silarylene, and straight, branched or cyclic divalent organopolysiloxane residues of 2 to 10 silicon atoms, preferably 2 to 5 silicon atoms are as exemplified above for the silalkylene, silarylene, and straight, branched or cyclic divalent organopolysiloxane residues of 2 to 10 silicon atoms, preferably 2 to 5 silicon atoms, represented by Z in formula (3).

Exemplary of the lipophilic group-containing (hydrolyzable) organosiloxane compound having formula (2) are compounds of the following formulae.

[Chem. 25]

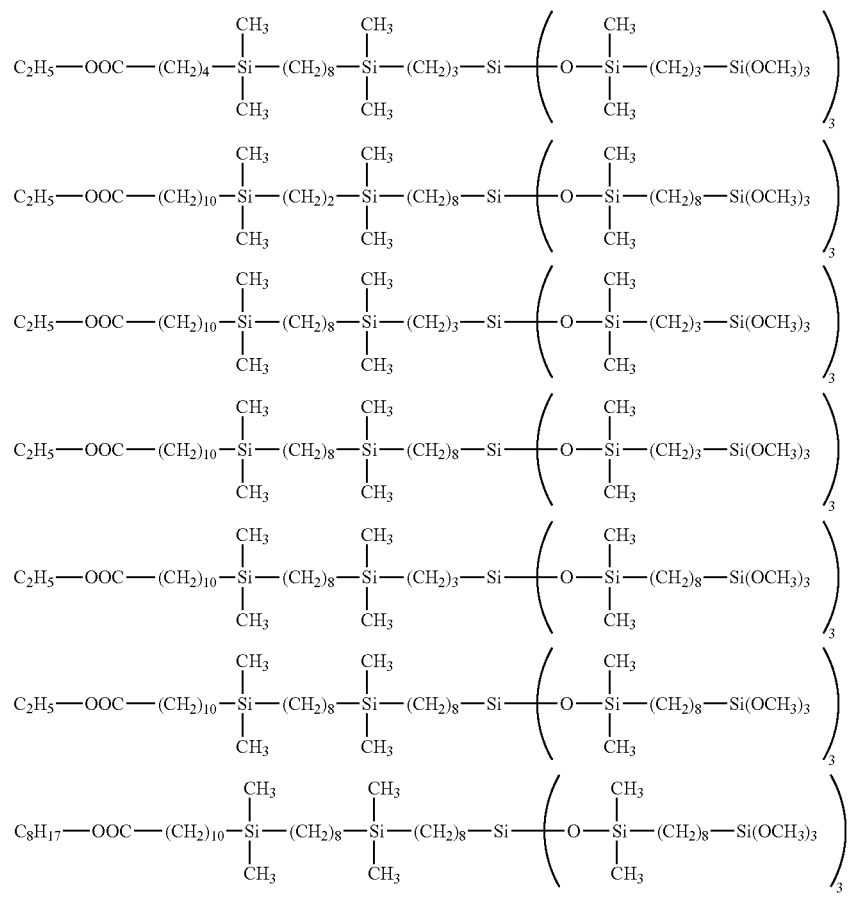

[Chem. 26]

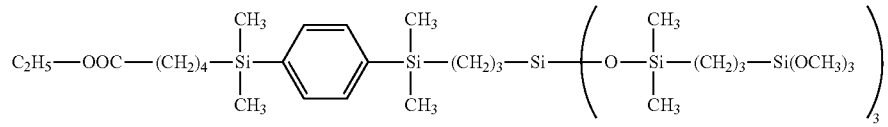

-continued
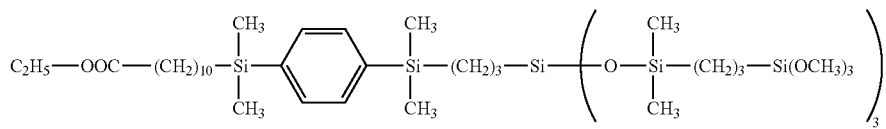
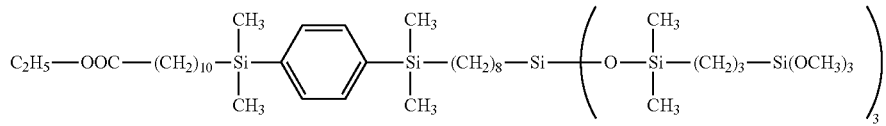
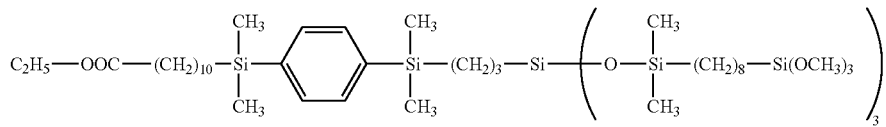
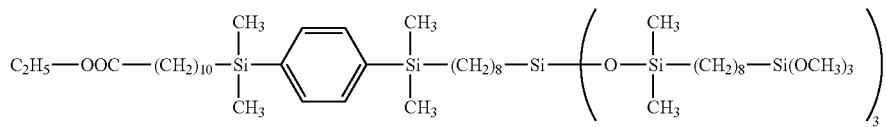
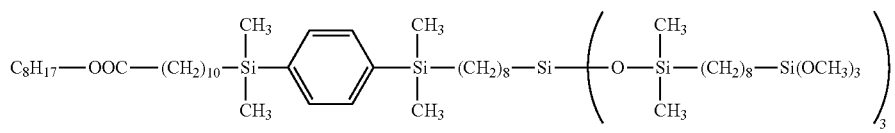
[Chem. 27]
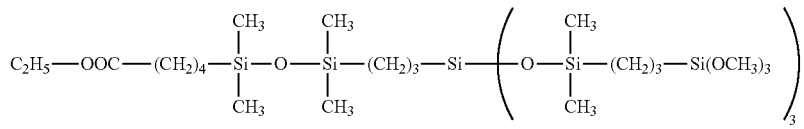
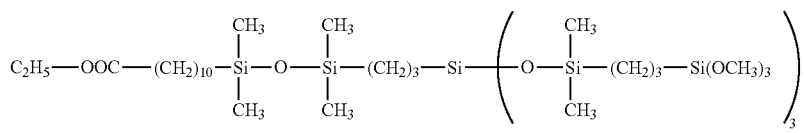
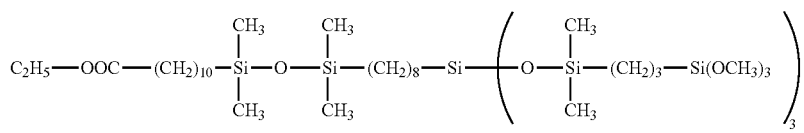
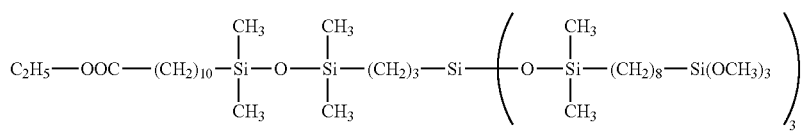
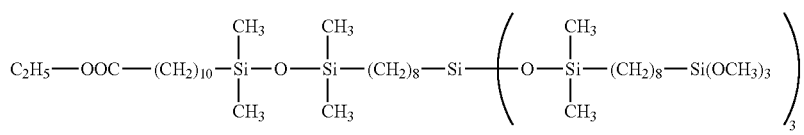

-continued

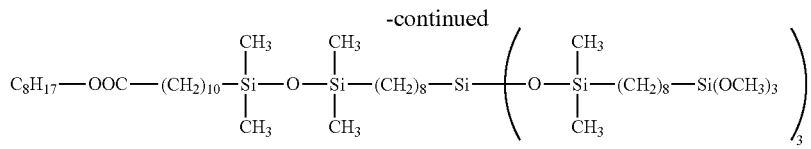

The lipophilic group-containing (hydrolyzable) organosiloxane compound having formula (1), especially wherein R is methyl may be prepared, for example, by the following method.

A siloxane compound (organohydrogensiloxane compound) having "A" in formula (1) and plural SiH groups (silicon-bonded hydrogen atoms) at opposite ends of the molecular chain is heated and stirred at a temperature of 40 to 120° C., preferably 60 to 100° C., most preferably about 80° C., after which a hydrosilylation catalyst, for example, toluene solution of chloroplatinic acid/vinylsiloxane complex is added. Subsequently, a silane compound having a hydrolyzable silyl group and an olefin site (e.g., alkenyl group) at opposite ends of the molecular chain is added dropwise. The reaction mixture is then aged at a temperature of 40 to 120° C., preferably 60 to 100° C., most preferably about 80° C., for 10 minutes to 12 hours, preferably 1 to 6 hours, most preferably about 3 hours. The reaction mixture may be diluted with an organic solvent prior to the reaction.

Exemplary of the siloxane compound having "A" in formula (1) and plural SiH groups at opposite ends of the molecular chain (i.e., organohydrogensiloxane compound) are siloxane compounds having the general formula (4).

[Chem. 28]

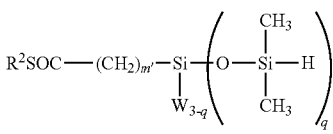

(4)

Herein A, Y, W and q are as defined above.

Illustrative examples of the siloxane compound having formula (4) include organohydrogensiloxane compounds having the general formulae (a) to (j).

[Chem. 29]

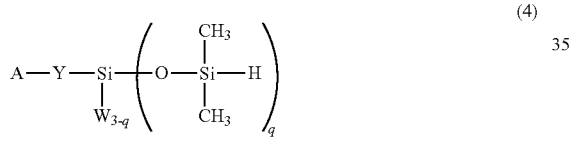

(a)

[Chem. 30]

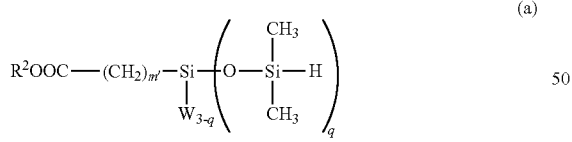

(b)

[Chem. 31]

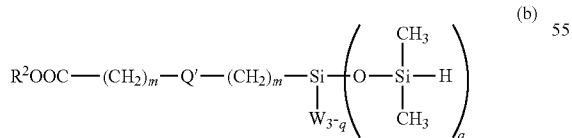

(c)

[Chem. 32]

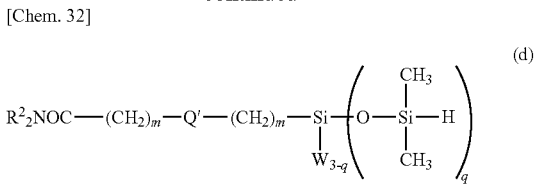

(d)

[Chem. 33]

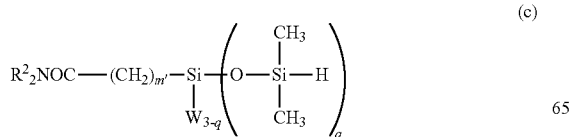

(e)

[Chem. 34]

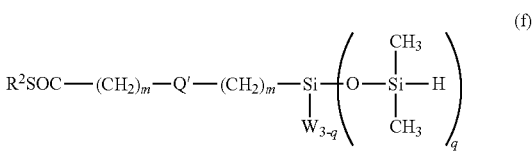

(f)

[Chem. 35]

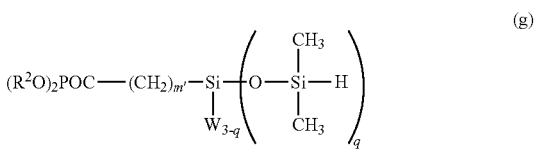

(g)

[Chem. 36]

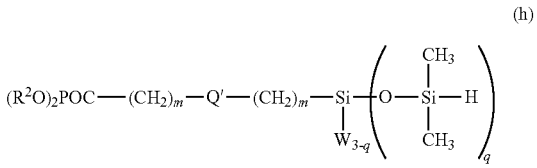

(h)

[Chem. 37]

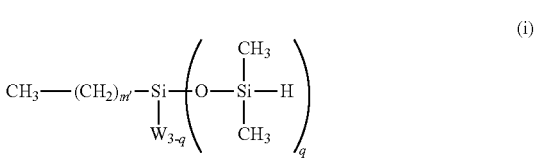

(i)

[Chem. 38]

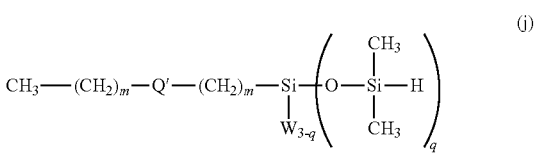

(j)

Herein $R^2$, W, m and q are as defined above, m' is an integer of 2 to 20, preferably 2 to 10, and Q' is a divalent group selected from silalkylene groups, silarylene groups, and straight, branched or cyclic divalent organopolysiloxane residues of 2 to 10 silicon atoms.

Illustrative examples of the organohydrogensiloxane compound having formula (a) are shown below.

[Chem. 39]
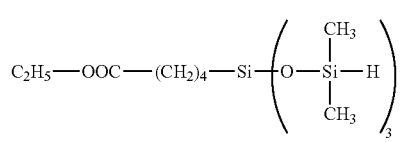
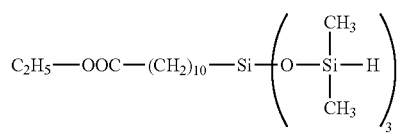
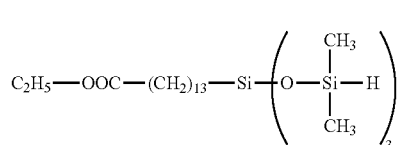
[Chem. 40]
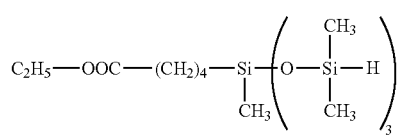
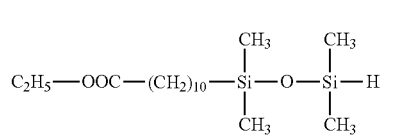
[Chem. 41]
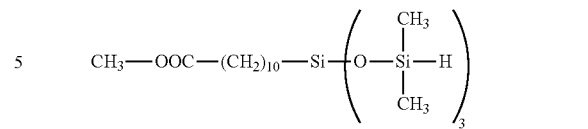
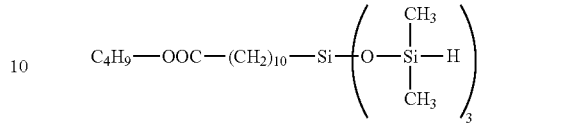
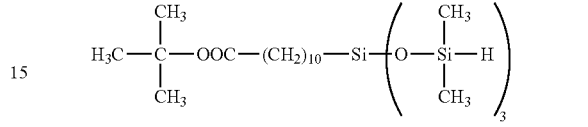
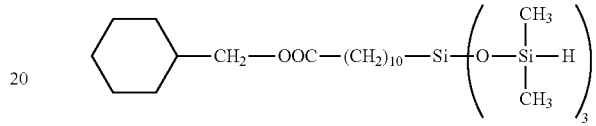
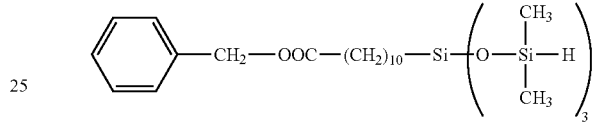
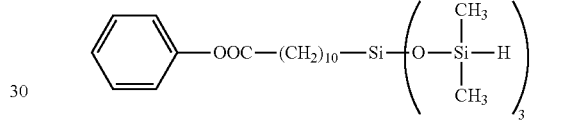
Illustrative examples of the organohydrogensiloxane compound having formula (b) are shown below.
[Chem. 42]
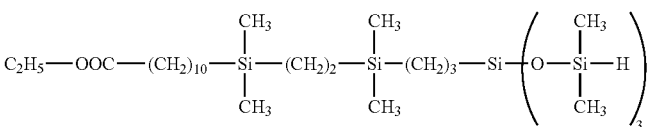
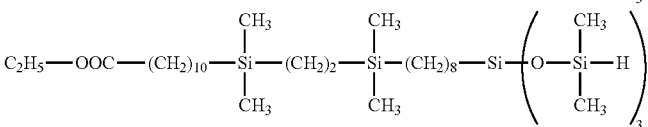
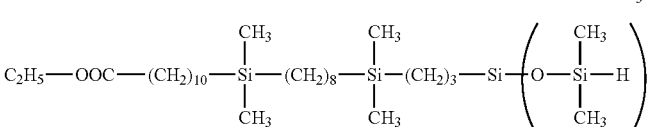
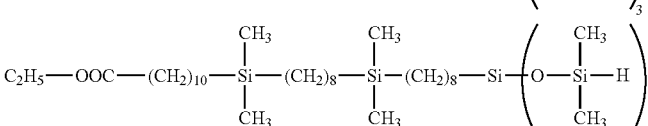
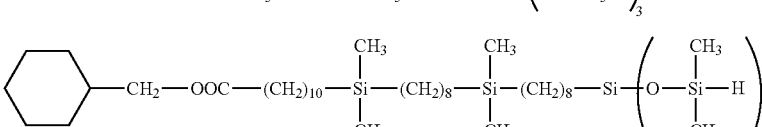
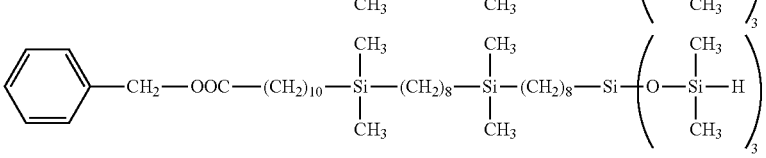

[Chem. 43]
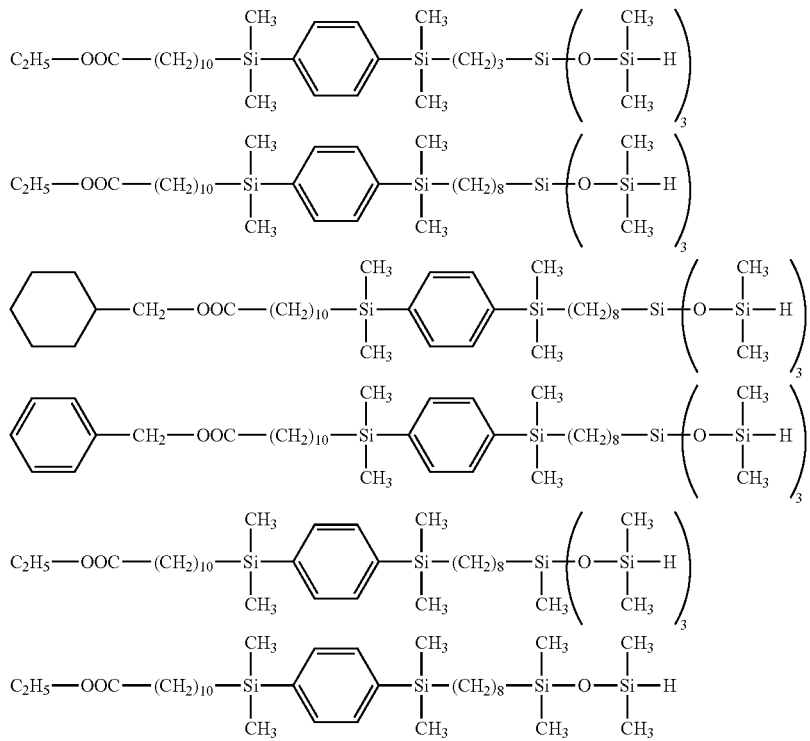
[Chem. 44]
Illustrative examples of the organohydrogensiloxane compound having formula (c) are shown below.
[Chem. 45]
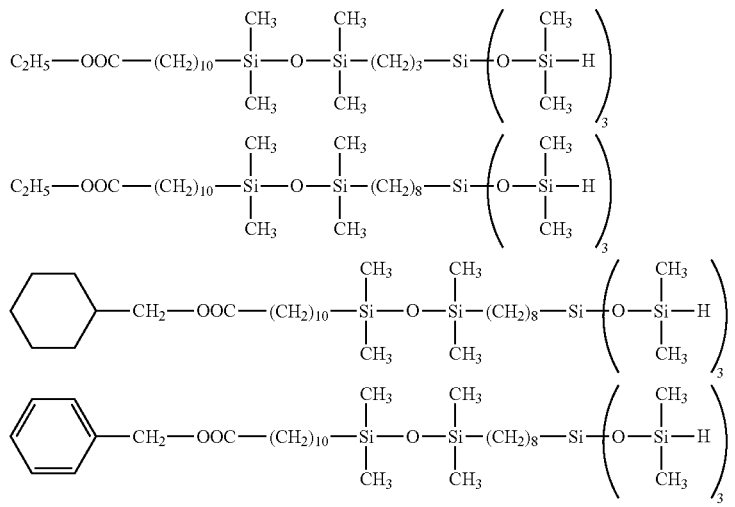

[Chem. 46]
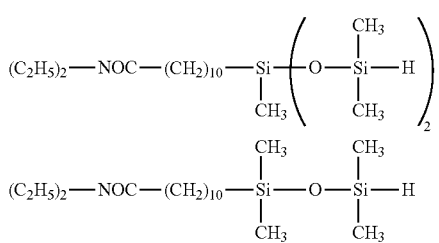
Illustrative examples of the organohydrogensiloxane compound having formula (d) are shown below.
[Chem. 47]
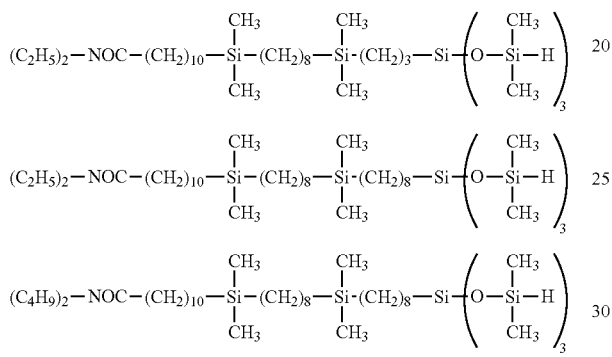
[Chem. 48]
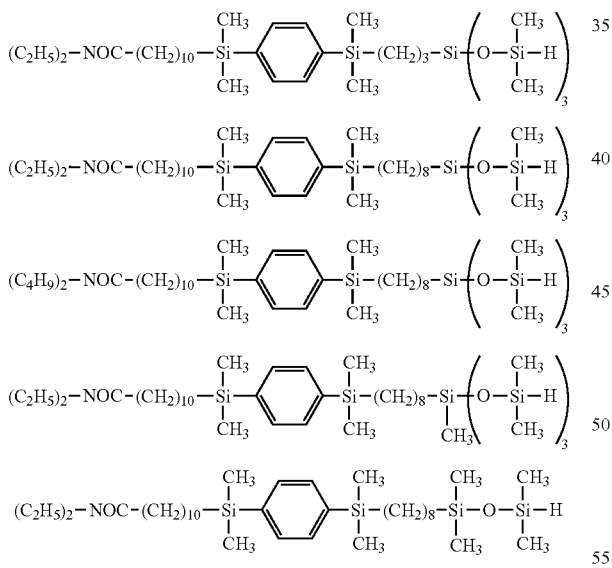
[Chem. 49]
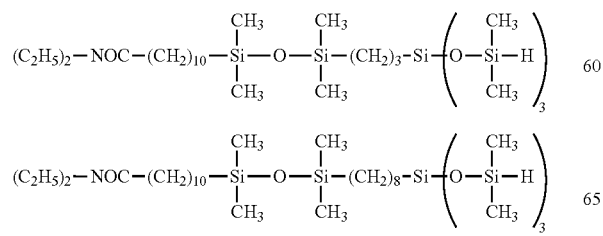
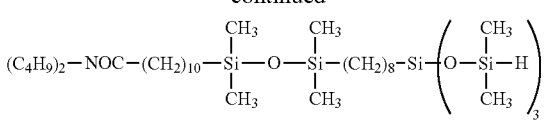
Illustrative examples of the organohydrogensiloxane compound having formula (e) are shown below.
[Chem. 50]
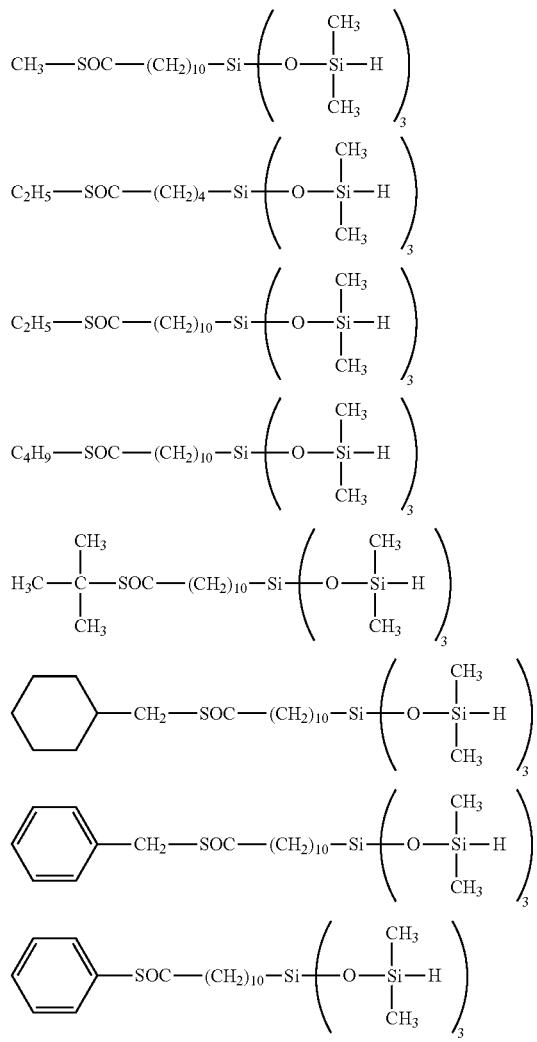
[Chem. 51]
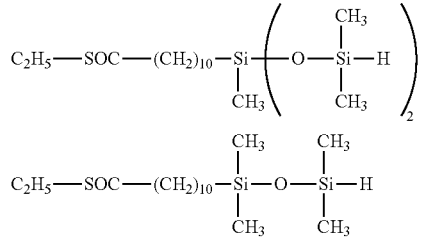
Illustrative examples of the organohydrogensiloxane compound having formula (f) are shown below.

[Chem. 52]
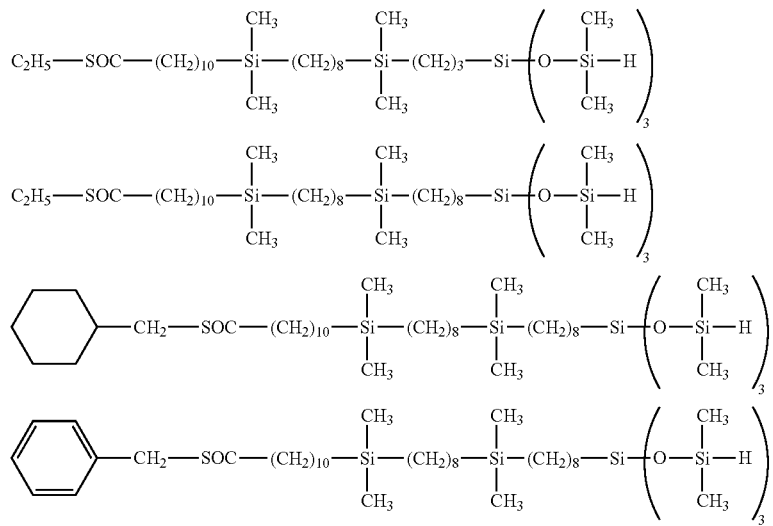
[Chem. 53]
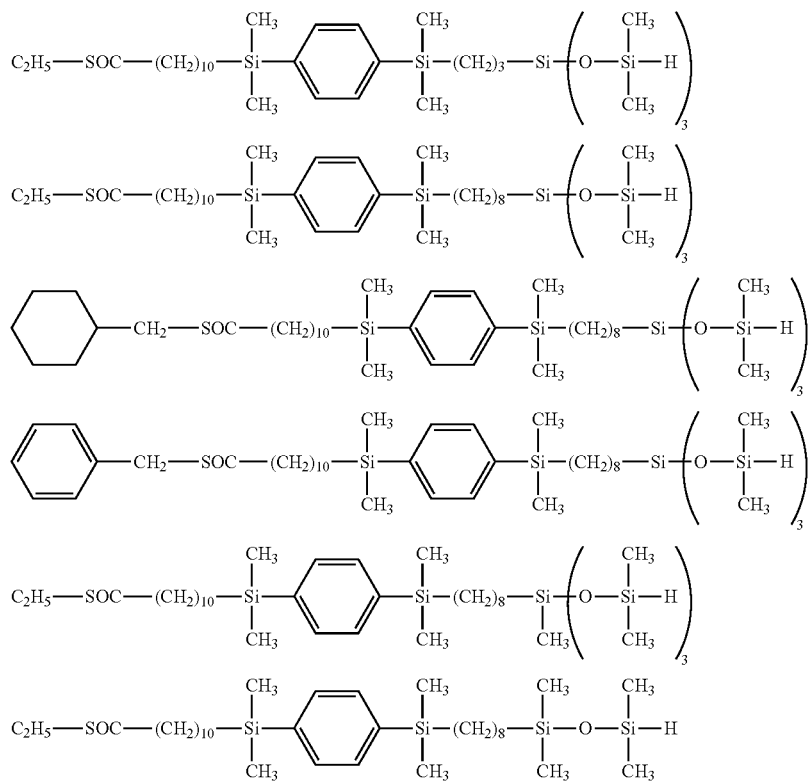
[Chem. 54]
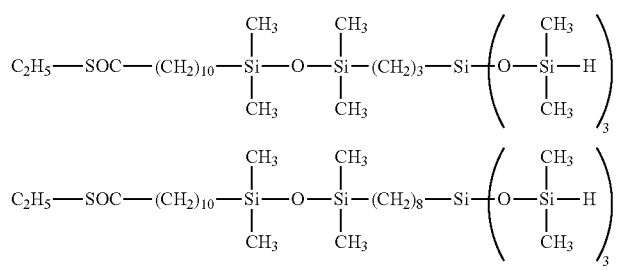

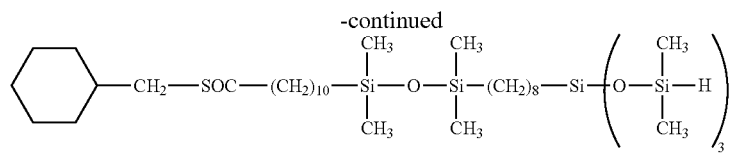
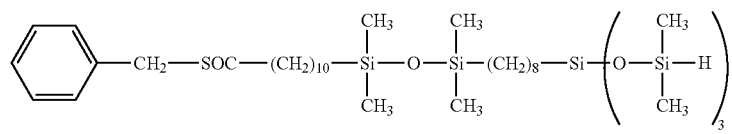
Illustrative examples of the organohydrogensiloxane compound having formula (g) are shown below.
[Chem. 55]
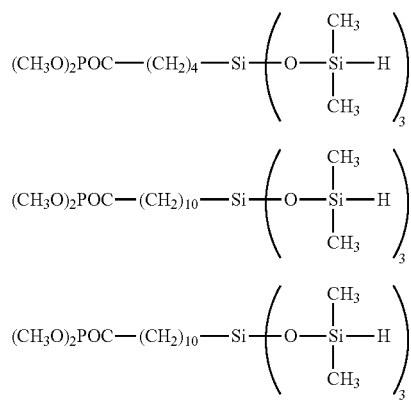
[Chem. 56]
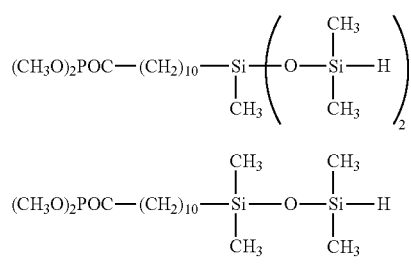
Illustrative examples of the organohydrogensiloxane compound having formula (h) are shown below.
[Chem. 57]
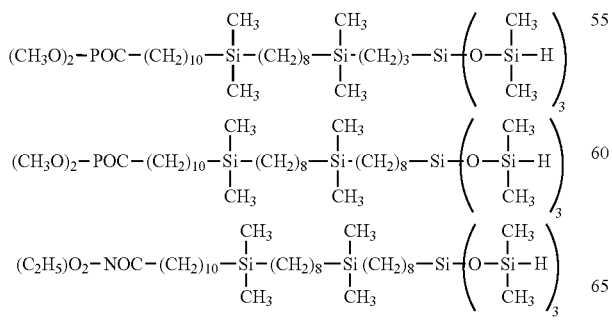
[Chem. 58]
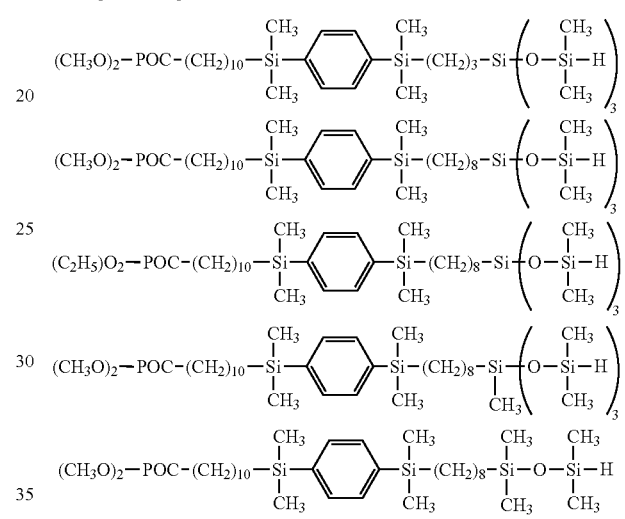
[Chem. 59]
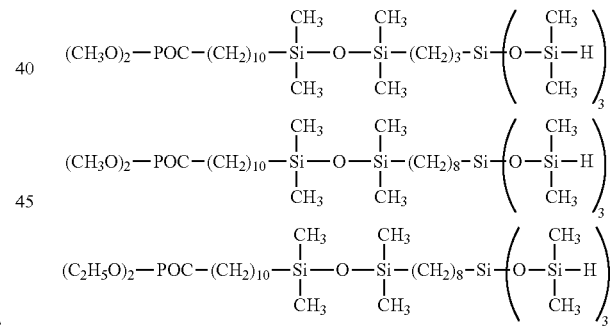
Illustrative examples of the organohydrogensiloxane compound having formula (i) are shown below.
[Chem. 60]
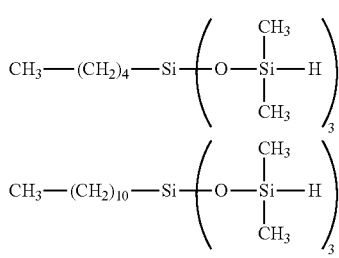

-continued

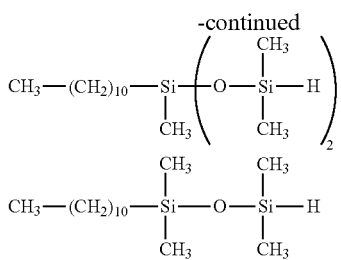

Illustrative examples of the organohydrogensiloxane compound having formula (j) are shown below.

[Chem. 61]

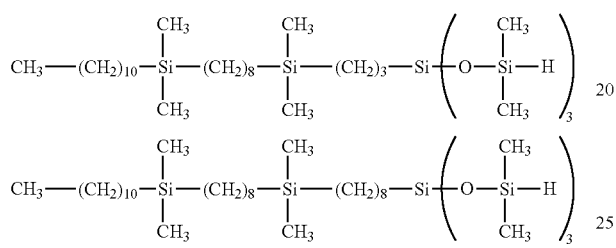

[Chem. 62]

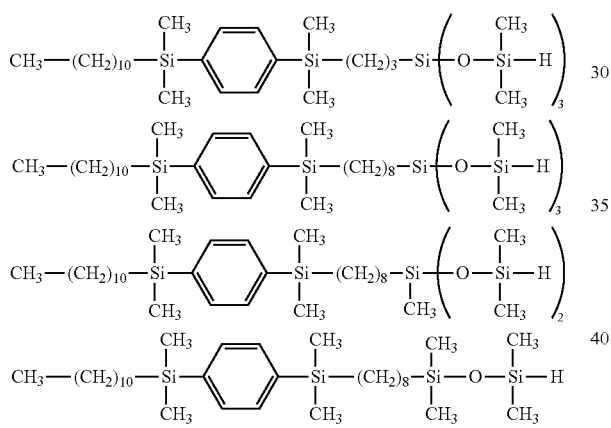

[Chem. 63]

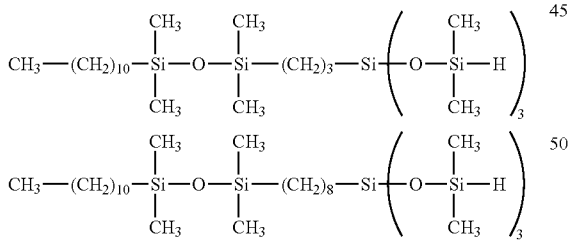

The organohydrogensiloxane compound having formula (4), especially any of formulae (a) to (j) may be prepared by stirring a silane or siloxane compound having "A" in formula (1) and hydrolyzable silyl group at opposite ends of the molecular chain at a temperature of −20° C. to 40° C., preferably −10° C. to 20° C., more preferably 0° C. to 10° C., adding thereto dropwise a tetraorganodisiloxane (e.g., 1,3-dihydro-1,1,3,3-tetraorganodisiloxane) such as tetramethyldisiloxane (e.g., 1,3-dihydro-1,1,3,3-tetramethyldisiloxane) and a co-hydrolytic reaction catalyst. e.g., hydrochloric acid or sulfuric acid, and aging at a temperature of −20° C. to 40° C., preferably −10° C. to 20° C., more preferably 0° C. to 10° C., for 10 minutes to 12 hours, preferably 1 to 6 hours. The reaction system may be diluted with an organic solvent prior to the reaction.

Examples of the silane or siloxane compound having "A" in formula (1) and hydrolyzable silyl group at opposite ends of the molecular chain include silane or siloxane compounds having the general formula (5).

[Chem. 64]

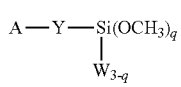

Herein A, Y, W and q are as defined above.

Illustrative examples of the silane or siloxane compound having formula (5) are shown below.

[Chem. 65]

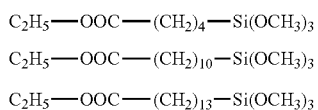

[Chem. 66]

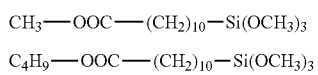

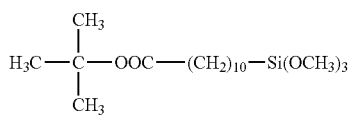

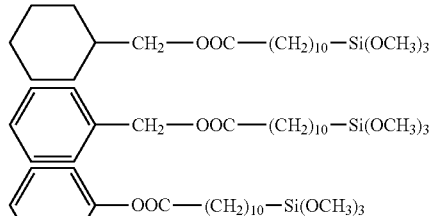

[Chem. 67]

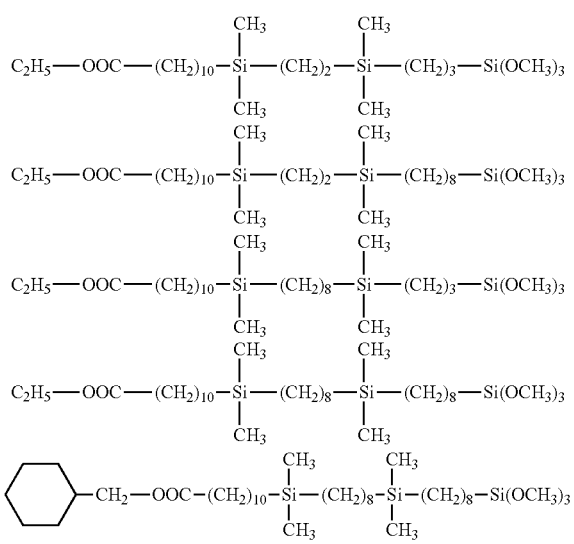

-continued
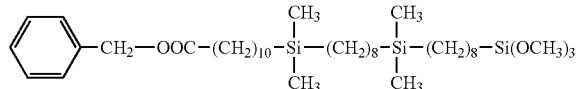
[Chem. 68]
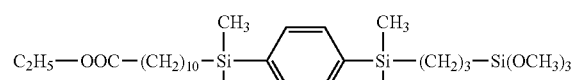
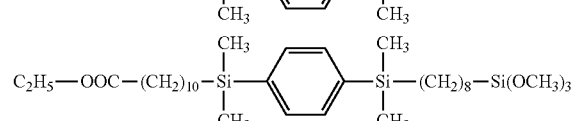
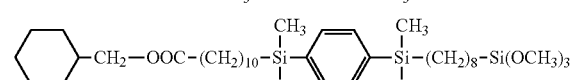
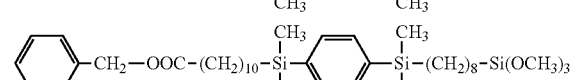
[Chem. 69]
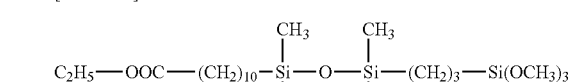
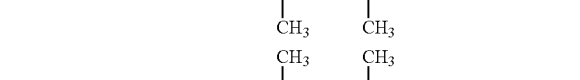
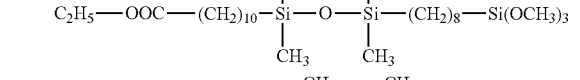
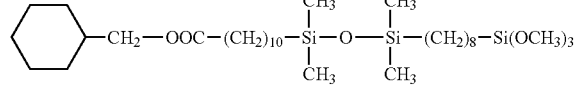
[Chem. 70]
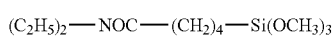
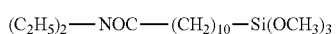
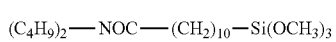
[Chem. 71]
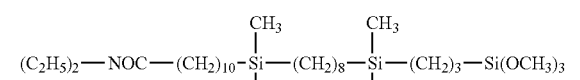
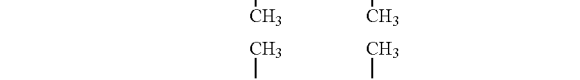
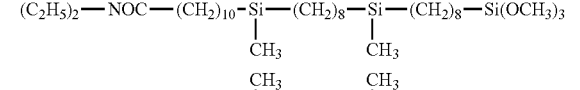
[Chem. 72]
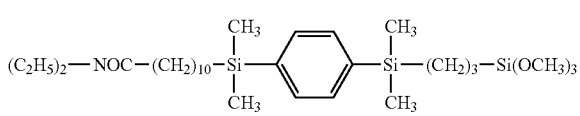
-continued
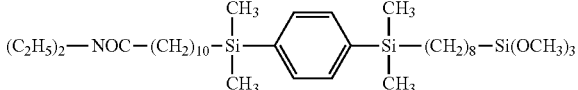
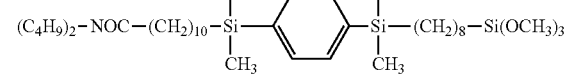
[Chem. 73]
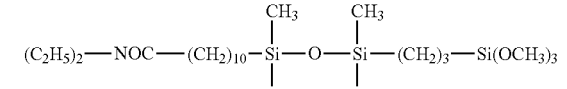
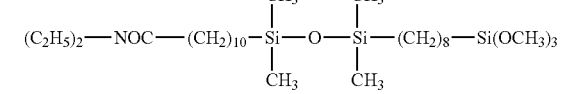
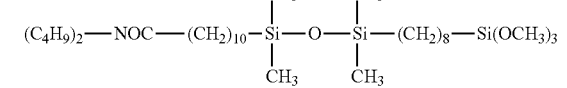
[Chem. 74]
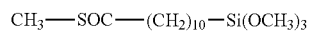
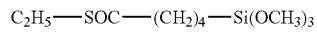
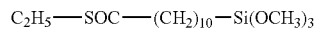
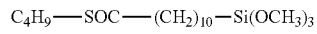
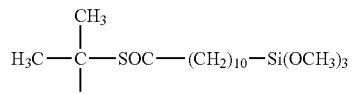
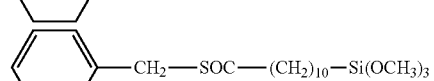
[Chem. 75]
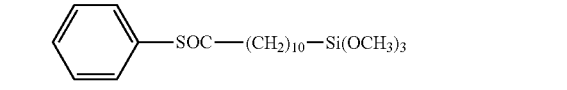
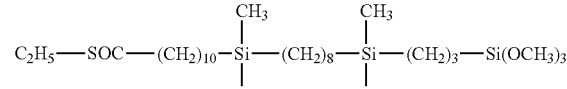
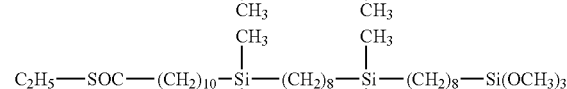
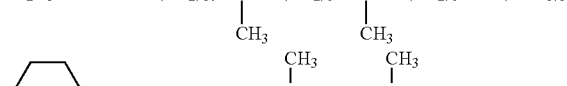
[Chem. 76]
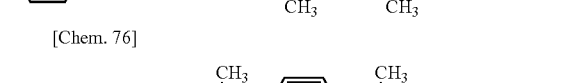

-continued
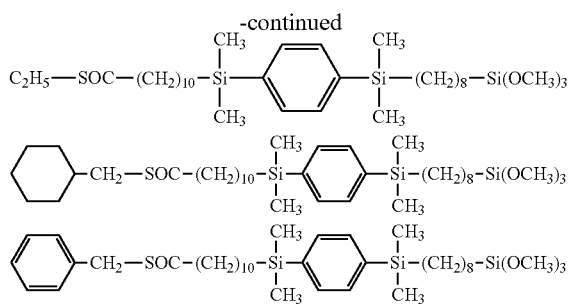
[Chem. 77]
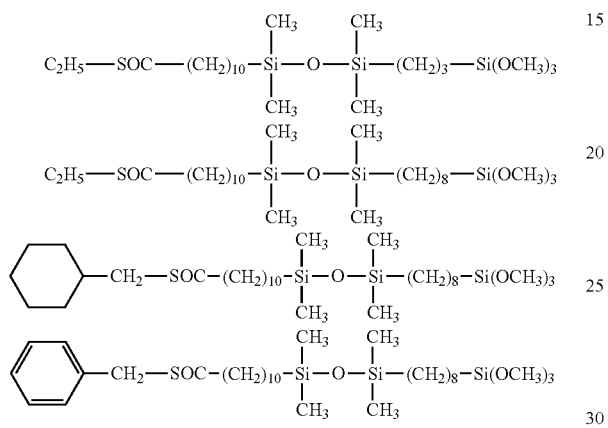
[Chem. 78]
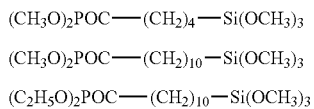
[Chem. 79]
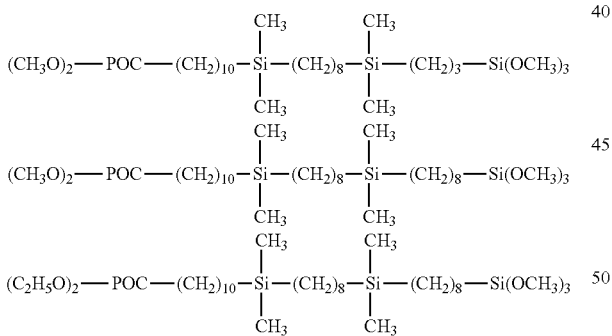
[Chem. 80]
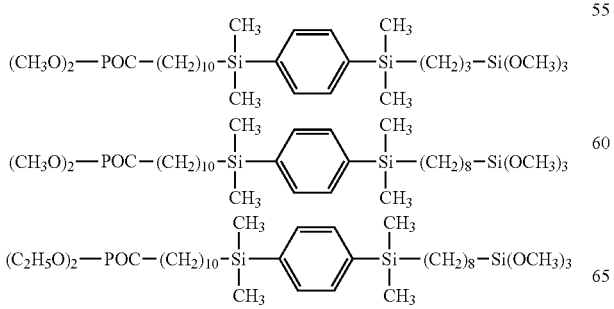
[Chem. 81]
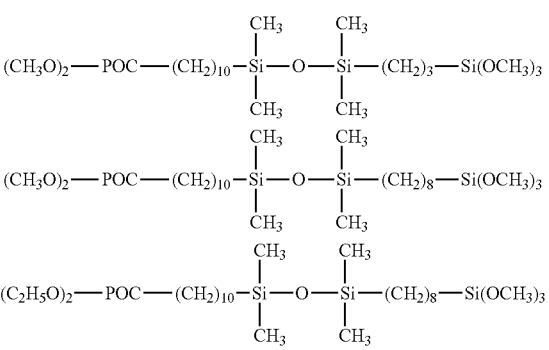
[Chem. 82]
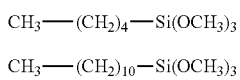
[Chem. 83]
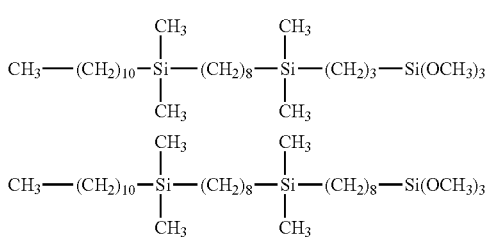
[Chem. 84]
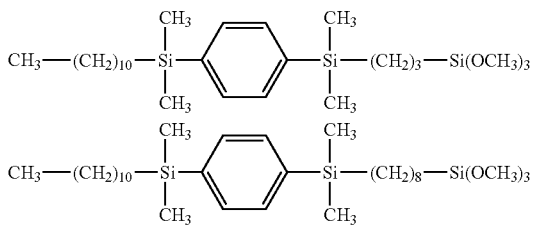
[Chem. 85]
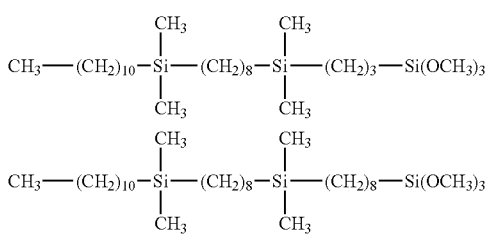
[Chem. 86]
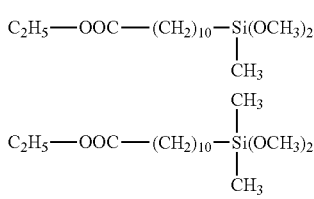
[Chem. 87]
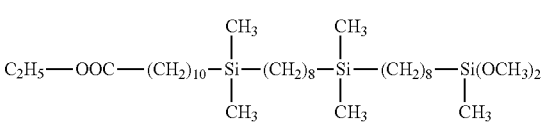

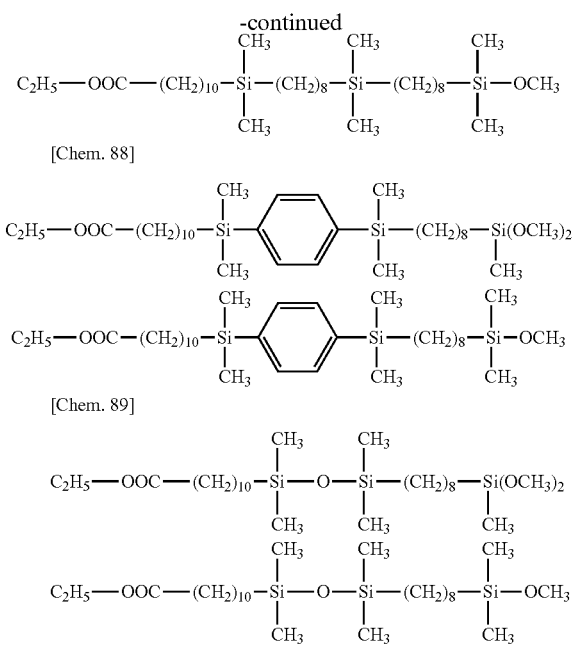

[Chem. 88]

[Chem. 89]

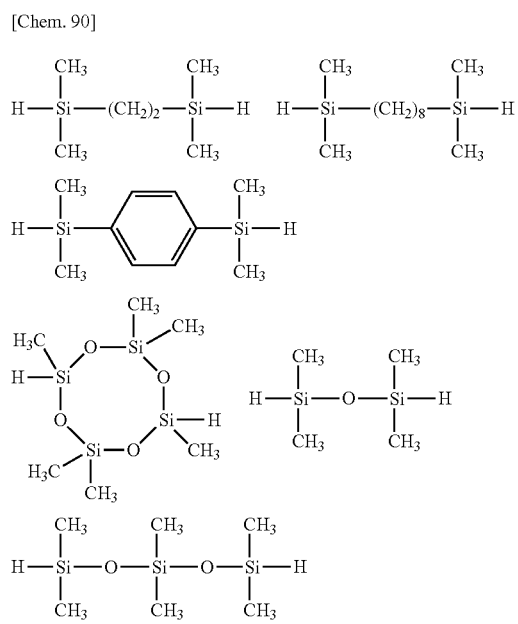

The silane or siloxane compound of formula (5) having "A" in formula (1) and hydrolyzable silyl group at opposite ends of the molecular chain, especially the silane or siloxane compound of formula (5) wherein Y is an alkylene group containing a divalent group selected from silalkylene groups, silarylene groups, and straight, branched or cyclic divalent organopolysiloxane residues of 2 to 10 silicon atoms may be prepared, for example, by heating and stirring a compound having two SiH groups at molecular ends, e.g., 1,4-bis(dimethylsilyl)benzene at a temperature of 40 to 120° C., preferably 60 to 100° C. most preferably about 80° C., and adding a hydrosilylation catalyst. e.g., toluene solution of chloroplatinic acid/vinylsiloxane complex. Subsequently, a compound having "A" in formula (1) and olefin site (e.g., alkenyl group) at opposite ends of the molecular chain is slowly added dropwise over an ample time to the reaction system, which is aged at a temperature of 40 to 120° C. preferably 60 to 100° C., most preferably about 80° C., for 10 minutes to 12 hours, preferably 1 to 6 hours, whereupon a silane or siloxane compound having "A" in formula (1) and terminal SiH group at opposite ends of the molecular chain is obtained. The system may be diluted with an organic solvent prior to the reaction.

Subsequently, the silane or siloxane compound having "A" in formula (1) and terminal SiH group at opposite ends of the molecular chain is heated and stirred at a temperature of 40 to 120° C., preferably 60 to 100° C., most preferably about 80° C., and a hydrosilylation catalyst, e.g., toluene solution of chloroplatinic acid/vinylsiloxane complex is added. Subsequently, a silane compound having a hydrolyzable silyl group and olefin site (e.g., alkenyl group) at opposite ends of the molecular chain is added dropwise to the reaction system, which is aged at a temperature of 40 to 120° C., preferably 60 to 100° C., most preferably about 80° C. for 10 minutes to 12 hours, preferably 1 to 6 hours. The system may be diluted with an organic solvent prior to the reaction.

Illustrative examples of the compound having two SiH groups at molecular ends are shown below.

Illustrative examples of the compound having "A" in formula (1) and olefin site at opposite ends of the molecular chain are shown below.

[Chem. 91]

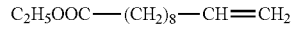
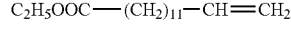
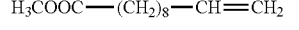
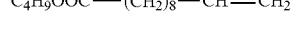
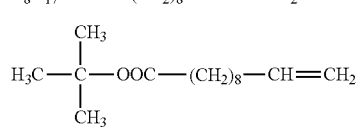
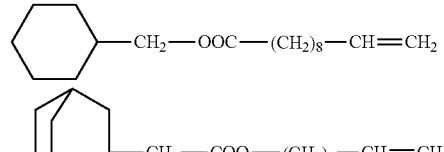
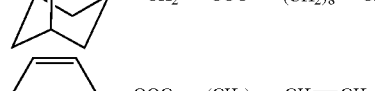
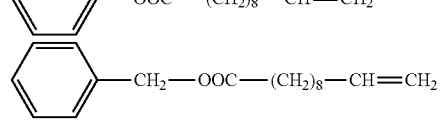

[Chem. 92]

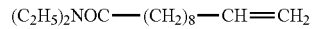
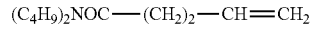

-continued

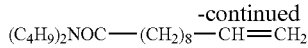
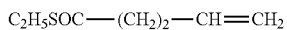
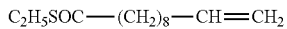
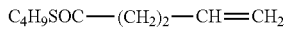
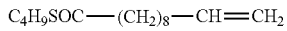
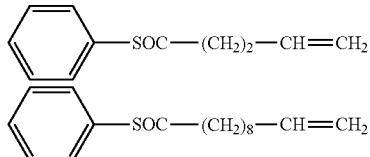
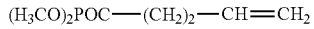
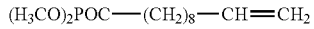
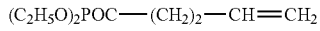
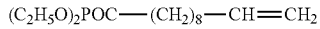
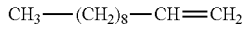
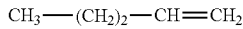

The compound having "A" in formula (1) and olefin site at opposite ends of the molecular chain is preferably used in an amount of 0.05 to 0.5 equivalent, more preferably 0.1 to 0.4 equivalent per equivalent of the compound having two SiH groups at molecular ends.

Examples of the hydrosilylation catalyst used in the preparation of the silane or siloxane compound having formula (5) include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris(triphenylphosphine)rhodium. Inter alia, platinum based compounds such as vinylsiloxane coordination compounds are preferred.

In the reaction of the compound having two SiH groups at molecular ends with the compound having "A" in formula (1) and an olefin site at opposite ends of the molecular chain, the hydrosilylation catalyst is preferably used in such an amount as to give 0.1 to 100 ppm, more preferably 0.2 to 50 ppm of transition metal based on the total weight of the compound having two SiH groups at molecular ends and the compound having "A" in formula (1) and an olefin site at opposite ends of the molecular chain.

In the preparation of the silane or siloxane compound having formula (5), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

In the reaction of the compound having two SiH groups at molecular ends with the compound having "A" in formula (1) and an olefin site at opposite ends of the molecular chain, the organic solvent may be used in an amount of 10 to 300 parts by weight, preferably 50 to 150 parts by weight, most preferably about 100 parts by weight per 100 parts by weight of the compound having "A" in formula (1) and an olefin site at opposite ends of the molecular chain.

Through the subsequent steps of quenching the reaction and distilling off the organic solvent, the silane or siloxane compound having "A" in formula (1) and terminal SiH group at opposite ends of the molecular chain is obtained.

Examples of the silane or siloxane compound having "A" in formula (1) and terminal SiH group at opposite ends of the molecular chain are shown below.

[Chem. 93]

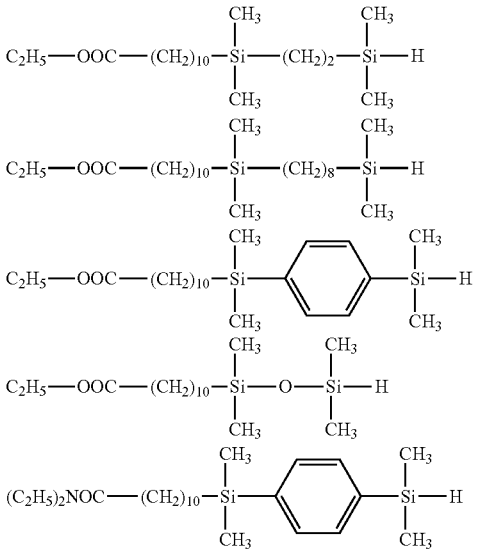

Shown below are examples of the compound having a hydrolyzable silyl group and an olefin site (e.g., alkenyl group) at opposite ends of the molecular chain, which is used in the preparation of the silane or siloxane compound having formula (5).

[Chem. 94]

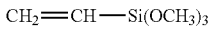
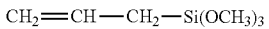
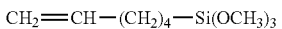
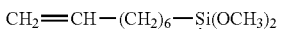
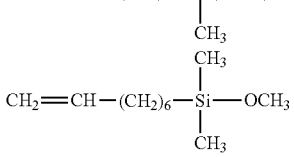

The compound having a hydrolyzable silyl group and an olefin site at opposite ends of the molecular chain is preferably used in an amount of 1 to 5 equivalents, more preferably 1.1 to 2.5 equivalents per equivalent of the silane or siloxane compound having "A" in formula (1) and terminal silyl group at opposite ends of the molecular chain.

In the reaction of the silane or siloxane compound having "A" in formula (1) and terminal SiH group at opposite ends of the molecular chain, obtained as above, with the silane compound having a hydrolyzable silyl group and an olefin site at opposite ends of the molecular chain, for the preparation of the silane or siloxane compound of formula (5), the hydrosilylation catalyst is preferably used in such an amount as to give 0.1 to 100 ppm, more preferably 0.2 to 50 ppm of transition metal based on the total weight of the silane or siloxane compound having "A" in formula (1) and terminal SiH group at opposite ends of the molecular chain and the silane compound having a hydrolyzable silyl group and an olefin site at opposite ends of the molecular chain.

When an organic solvent is used in the reaction of the silane or siloxane compound having "A" in formula (1) and terminal SiH group at opposite ends of the molecular chain, obtained as above, with the silane compound having a hydrolyzable silyl group and an olefin site at opposite ends of the molecular chain, for the preparation of the silane or siloxane compound of formula (5), the amount of the solvent used is 10 to 300 parts by weight, preferably 50 to 150 parts by weight, most preferably about 100 parts by weight per 100 parts by weight of the silane or siloxane compound having "A" in formula (1) and terminal SiH group at opposite ends of the molecular chain.

Through the subsequent steps of quenching the reaction and distilling off the organic solvent and unreacted reactants, there is obtained the silane or siloxane compound having formula (5), especially the silane or siloxane compound of formula (5) wherein Y is an alkylene group containing a divalent group selected from silalkylene groups, silarylene groups and straight, branched or cyclic divalent organopolysiloxane residues of 2 to 10 silicon atoms.

The silane or siloxane compound having "A" in formula (1) and hydrolyzable silyl group at opposite ends of the molecular chain, represented by formula (5), especially the silane or siloxane compound of formula (5) wherein Y is an alkylene group may be prepared by heating and stirring a compound having "A" in formula (1) and an olefin site (e.g., alkenyl group) at opposite ends of the molecular chain at a temperature of 40 to 120° C., preferably 60 to 100° C., most preferably about 80° C. and adding a hydrosilylation catalyst, for example, toluene solution of chloroplatinic acid/vinylsiloxane complex. Subsequently, a compound having a hydrolyzable silyl group and a SiH group at opposite ends of the molecular chain is slowly added dropwise over time, and the reaction mixture is aged at a temperature of 40 to 120° C., preferably 60 to 100° C., most preferably about 80° C. for 10 minutes to 12 hours, preferably 1 to 6 hours, yielding the silane or siloxane compound having "A" in formula (1) and hydrolyzable silyl group at opposite ends of the molecular chain, especially the silane or siloxane compound of formula (5) wherein Y is an alkylene group. The reaction mixture may be diluted with an organic solvent prior to the reaction.

Examples of the compound having a hydrolyzable silyl group and a SiH group at opposite ends of the molecular chain are shown below.

[Chem. 95]

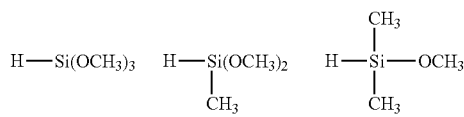

The compound having "A" in formula (1) and an olefin site (e.g., alkenyl group) at opposite ends of the molecular chain is preferably used in an amount of 0.2 to 1 equivalent, more preferably 0.4 to 0.8 equivalent per equivalent of the compound having a hydrolyzable silyl group and a SiH group at opposite ends of the molecular chain.

Examples of the hydrosilylation catalyst used in the preparation of the silane or siloxane compound of formula (5) wherein Y is an alkylene group, are as exemplified above. The hydrosilylation catalyst is preferably used in such an amount as to give 0.1 to 100 ppm, more preferably 0.2 to 50 ppm of transition metal based on the total weight of the compound having "A" in formula (1) and an olefin site at opposite ends of the molecular chain and the compound having a hydrolyzable silyl group and a SiH group at opposite ends of the molecular chain.

When an organic solvent is used in the preparation of the silane or siloxane compound of formula (5) wherein Y is an alkylene group, examples of the organic solvent are as exemplified above. The amount of the solvent used is 10 to 300 parts by weight, preferably 50 to 150 parts by weight, most preferably about 100 parts by weight per 100 parts by weight of the compound having "A" in formula (1) and an olefin site at opposite ends of the molecular chain.

In the preparation of the organohydrogensiloxane compound having formula (4), especially any of formulae (a) to (j), the silane or siloxane compound having "A" in formula (1) and a hydrolyzable silyl group at opposite ends of the molecular chain is preferably used in an amount of 0.1 to 0.6 equivalent, more preferably 0.2 to 0.5 equivalent per equivalent of the tetraorganodisiloxane.

Examples of the co-hydrolytic catalyst used in the preparation of the organohydrogensiloxane compound having formula (4), especially any of formulae (a) to (j) include organotin compounds such as dibutyltin dimethoxide and dibutyltin dilaurate, organotitanium compounds such as tetra-n-butyl titanate, organic acids such as acetic acid and methanesulfonic acid, and inorganic acids such as hydrochloric acid, sulfuric acid and phosphoric acid. Of these, hydrochloric acid and sulfuric acid are preferred.

The co-hydrolytic catalyst is preferably used in an amount of 1 to 10 equivalents, more preferably 2 to 8 equivalents per equivalent of the silane or siloxane compound having "A" in formula (1) and a hydrolyzable silyl group at opposite ends of the molecular chain.

In the preparation of the organohydrogensiloxane compound having formula (4), especially any of formulae (a) to (j), an organic solvent may be used. Suitable organic solvents include ether solvents such as dibutyl ether, diethyl ether and tetrahydrofuran, hydrocarbon solvents such as petroleum benzine, toluene and xylene, and fluorochemical solvents such as perfluorohexane and 1,4-bis(trifluoromethyl)benzene. Of these, toluene and 1,4-bis(trifluoromethyl)benzene are preferred.

The organic solvent may be used in an amount of 10 to 300 parts by weight, preferably 50 to 150 parts by weight per 100 parts by weight of the silane or siloxane compound having "A" in formula (1) and a hydrolyzable silyl group at opposite ends of the molecular chain.

Through the subsequent steps of quenching the reaction and distilling off the organic solvent, the organohydrogensiloxane compound having formula (4), especially any of formulae (a) to (j) is obtained.

Shown below are examples of the silane compound having a hydrolyzable silyl group and an olefin site (e.g., alkenyl group) at opposite ends of the molecular chain, used in the preparation of the lipophilic group-containing (hydrolyzable) organosiloxane compound having formula (1).

[Chem. 96]

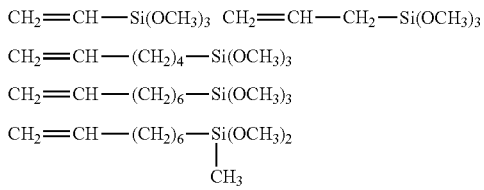

-continued

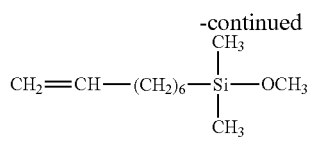

The silane compound having a hydrolyzable silyl group and an olefin site at opposite ends of the molecular chain is preferably used in an amount of 3 to 10 equivalents, more preferably 3.5 to 8 equivalents per equivalent of the organohydrogensiloxane compound having "A" in formula (1) and plural SiH groups at opposite ends of the molecular chain.

Examples of the hydrosilylation catalyst used in the preparation of the lipophilic group-containing (hydrolyzable) organosiloxane compound having formula (1) include platinum group metal based catalysts such as platinum black, chloroplatinic acid, alcohol-modified chloroplatinic acid, complexes of chloroplatinic acid with olefins, aldehydes, vinylsiloxanes, or acetylene alcohols, tetrakis(triphenylphosphine)palladium, and chlorotris(triphenylphosphine)rhodium. Inter alia, platinum based compounds such as vinylsiloxane coordination compounds are preferred.

The hydrosilylation catalyst is preferably used in such an amount as to give 0.1 to 100 ppm, more preferably 0.2 to 50 ppm of transition metal based on the total weight of the organohydrogensiloxane compound having "A" in formula (1) and plural SiH groups at opposite ends of the molecular chain and the silane compound having a hydrolyzable silyl group and an olefin site at opposite ends of the molecular chain.

In the preparation of the lipophilic group-containing (hydrolyzable) organosiloxane compound having formula (1), an organic solvent may be used. Suitable organic solvents include ether solvents such as dibutyl ether, diethyl ether and tetrahydrofuran, and hydrocarbon solvents such as petroleum benzine, toluene and xylene. Of these, toluene is most preferred.

The organic solvent may be used in an amount of 10 to 300 parts by weight, preferably 50 to 150 parts by weight, most preferably about 100 parts by weight per 100 parts by weight of the organohydrogensiloxane compound having "A" in formula (1) and plural SiH groups at opposite ends of the molecular chain.

Through the subsequent steps of quenching the reaction and distilling off the organic solvent and unreacted reactants, the lipophilic group-containing (hydrolyzable) organosiloxane compound having formula (1) is obtained.

For example, when a compound having the following formula:

[Chem. 97]

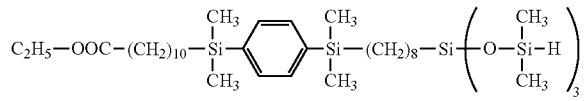

is used as the organohydrogensiloxane compound having "A" in formula (1) and plural SiH groups at opposite ends of the molecular chain and a compound having the following formula:

$$CH_2=CH-(CH_2)_6-Si(OCH_3)_3$$ [Chem. 98]

is used as the compound having a hydrolyzable silyl group and an olefin site at opposite ends of the molecular chain, there is obtained a siloxane compound having the following formula.

[Chem. 99]

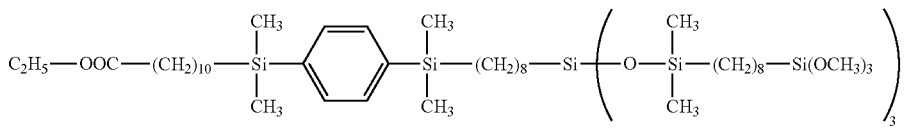

The lipophilic group-containing (hydrolyzable) organosiloxane compound having formula (1), obtained through the foregoing reactions, may be used after purification and isolation steps such as concentration, column purification, distillation and extraction, or directly in the reaction solution form as a mixture containing the lipophilic group-containing (hydrolyzable) organosiloxane compound having formula (1), or after dilution with an organic solvent or the like.

The lipophilic group-containing (hydrolyzable) organosiloxane compound of the invention thus obtained may be used as a surface treating agent for surface protection of various substrates to impart lipophilic properties and high abrasion resistance to the substrate surface. The surface treatment renders fingerprints on the substrate surface inconspicuous and prevents any performance loss by abrasion during actual service. The lipophilic group-containing (hydrolyzable) organosiloxane compound of the invention is thus useful particularly as a surface treating agent for forming a coating or protective film to be applied to the surface of an article which is otherwise susceptible to fouling with human sebum or cosmetics upon contact with the human body.

The invention also provides a surface treating agent comprising the lipophilic group-containing (hydrolyzable) organosiloxane compound. The surface treating agent may contain a single lipophilic group-containing (hydrolyzable) organosiloxane compound or a combination of two or more, or a partial condensate obtained from partial condensation of hydroxyl groups on the lipophilic group-containing organosiloxane compound, or a partial hydrolytic condensate which is obtained from partial hydrolysis of terminal hydrolyzable groups on the lipophilic group-containing hydrolyzable organosiloxane compound in a well-known way and condensation of the resulting hydroxyl groups.

The surface treating agent may further comprise a suitable solvent. Suitable solvents include alcohol solvents such as propylene glycol monomethyl ether (PGME), butanol and isopropanol, ether solvents such as dibutyl ether, diethyl ether and tetrahydrofuran, hydrocarbon solvents such as petroleum benzine, toluene and xylene, ketone solvents such as acetone, methyl ethyl ketone, and methyl isobutyl ketone. Inter alia, alcohol solvents and ether solvents are desirable in view of solubility and wettability, with PGME and dibutyl ether being most desirable.

The solvents may be used in admixture of two or more while it is preferred that the lipophilic group-containing (hydrolyzable) organosiloxane compound and partial (hydrolytic) condensate thereof be uniformly dissolved in the solvent. An optimum concentration of the lipophilic group-containing (hydrolyzable) organosiloxane compound and partial (hydrolytic) condensate thereof in the solvent varies with a particular treating mode. The amount which is easy to weigh may be chosen. In the case of direct coating, the concentration is preferably 0.01 to 10 parts by weight, more preferably 0.05 to 5 parts by weight per 100 parts by weight of the solvent and the lipophilic group-containing (hydrolyzable) organosiloxane compound (and partial (hydrolytic) condensate thereof). In the case of evaporation treatment, the concentration is preferably 1 to 100 parts by weight, more preferably 3 to 30 parts by weight per 100 parts by weight of the solvent and the lipophilic group-containing (hydrolyzable) organosiloxane compound (and partial (hydrolytic) condensate thereof). In the case of wet treatment, the concentration is preferably 0.01 to parts by weight, more preferably 0.05 to 1 part by weight per 100 parts by weight of the solvent and the lipophilic group-containing (hydrolyzable) organosiloxane compound (and partial (hydrolytic) condensate thereof).

To the surface treating agent, a hydrolytic condensation catalyst may be added. Exemplary catalysts include organotin compounds such as dibutyltin dimethoxide and dibutyltin dilaurate, organotitanium compounds such as tetra-n-butyl titanate, organic acids such as acetic acid and methanesulfonic acid, and inorganic acids such as hydrochloric acid, sulfuric acid and phosphoric acid. Of these, acetic acid, tetra-n-butyl titanate, and dibutyltin dilaurate are desirable. The hydrolytic condensation catalyst is preferably added in an amount of 0.1 to 150 parts, more preferably 25 to 125 parts, even more preferably 50 to 110 parts by weight per 100 parts by weight of the lipophilic group-containing (hydrolyzable) organosiloxane compound and partial (hydrolytic) condensate thereof.

The surface treating agent may be applied to a substrate by any well-known techniques such as brush coating, dipping, spraying, evaporation, and wet treatment. In the case of evaporation, the heating mode may be either resistance heating or EB heating and is not particularly limited. The curing temperature varies with a particular curing technique. For example, in the case of direct coating (brush coating, dipping or spraying), suitable curing conditions include a temperature of 25 to 200° C., especially 25 to 150° C. for 15 minutes to 36 hours, especially 30 minutes to 24 hours. Curing under humid conditions (50 to 90% RH) is also useful. When the coating technique is evaporation, the desirable temperature is in a range of 20 to 200° C. Curing under humid conditions (50 to 90% RH) is also useful. Further, in the case of wet coating, desirable conditions include room temperature (25° C.±10° C.) and 1 to 24 hours. Cure may be briefly completed by heating at 30 to 200° C. for 1 minute to 1 hour. Curing under humid conditions (50 to 90% RH) is also useful.

The cured coating typically has a thickness of 0.1 to 100 nm, desirably 1 to 20 nm although the thickness is selected depending on the type of substrate. Also, in the case of spray coating, for example, a procedure involving diluting the agent with an organic solvent having water previously added thereto, for thereby effecting hydrolysis to generate Si—OH, and thereafter, spraying the dilution is recommended because the coating rapidly cures.

The substrate to be treated with the surface treating agent is not particularly limited, and may be made of any desired materials including paper, fabric, metals, metal oxides, glass, plastics, ceramics, and quartz. The surface treating agent is effective for forming on the substrate a cured film having low fingerprint visibility and abrasion resistance.

Preferred articles which may be treated with the surface treating agent include car navigation systems, mobile phones, smart phones, digital cameras, digital video cameras, PDA, portable audio players, car audio players, game consoles, eyeglass lenses, camera lenses, lens filters, sunglasses, medical instruments (e.g., gastroscopes), copiers, personal computers, LC displays, organic EL displays, plasma displays, touch panel displays, protective film, anti-reflective film, and other optical articles.

EXAMPLES

Synthesis Examples, Examples and Comparative Examples are given below for illustrating the invention, but the invention is not limited by Examples.

Synthesis Example 1

A reactor was charged with 10.0 g ($4.71 \times 10^{-2}$ mol) of ethyl undecenoate, which was heated at 80° C. Then $1.0 \times 10^{-2}$ g of a toluene solution of chloroplatinic acid/vinylsiloxane complex (containing $0.3 \times 10^{-6}$ mol of Pt) was added, after which 8.6 g ($7.06 \times 10^{-2}$ mol) of trimethoxysilane was added dropwise over 3 hours. This was followed by heating and stirring for 1 hour. The solvent and unreacted reactants were distilled off under reduced pressure, obtaining 12.1 g of a compound having the formula (A).

[Chem. 100]

$^1$H-NMR
δ 0.8 (—($CH_2$)$_7$C$\underline{H}_2$—Si(O$CH_3$)$_3$) 2H
δ 1.2-1.4 (—(C$\underline{H}_2$)$_7$—, —O$CH_2$C$\underline{H}_3$) 17H
δ 1.6 (—OOC—$CH_2$C$\underline{H}_2$($CH_2$)$_7$$CH_2$—Si—) 2H
δ 2.3 (—OOC—C$\underline{H}_2$—) 2H
δ 3.5 (—Si(OC$\underline{H}_3$)$_3$) 9H
δ 4.1 (—OC$\underline{H}_2$$CH_3$) 2H Example 1

A reactor was charged with 4.5 g ($3.4 \times 10^{-2}$ mol) of tetramethyldisiloxane, 3.6 g of 12N hydrochloric acid aqueous solution, and 2.5 g of 1,4-bis(trifluoromethyl)benzene, which were cooled at 0° C. Subsequently, 5.0 g ($1.5 \times 10^{-2}$ mol) of the compound having formula (A):

[Chem. 101]

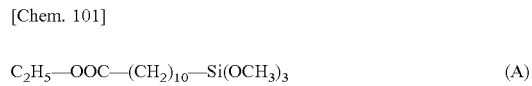

in Synthesis Example 1 was added dropwise to the mixture, which was aged at 0° C. for 6 hours. The lower layer was collected by separatory operation. The solvent and unreacted reactants were distilled off under reduced pressure, obtaining 5.8 g of a compound having the formula (B).

[Chem. 102]

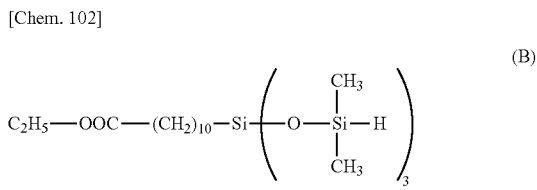

$^1$H-NMR
δ 0.1-0.2 (—Si-C$\underline{H}_3$) 18H
δ 0.5 (—(CH$_2$)$_7$C$\underline{H}_2$—Si(O—Si(CH$_3$)$_2$—)$_3$) 2H
δ 1.2-1.5 (—(C$\underline{H}_2$)$_7$—, —OCH$_2$C$\underline{H}_3$) 17H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 4.1 (—OC$\underline{H}_2$CH$_3$) 2H
δ 4.7 (—Si—$\underline{H}$) 3H A reactor was charged with 5.0 g (1.1×10$^{-2}$ mol) of the compound having formula (B).

[Chem. 103]

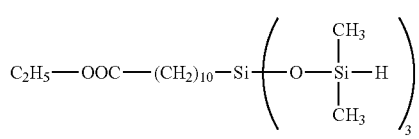
(B)

It was heated at 80° C. Then 5.0×10$^{-3}$ g of toluene solution of chloroplatinic acid/vinylsiloxane complex (containing 1.5×10$^{-7}$ mol of Pt) was added, after which 7.3 g (4.5×10$^{-2}$ mol) of allyltrimethoxysilane was added dropwise. This was followed by heating and stirring for 3 hours. The solvent and unreacted reactants were distilled off under reduced pressure, obtaining 8.8 g of a product (lipophilic group-containing hydrolyzable organosiloxane compound 1) having the formula (C).

[Chem. 104]

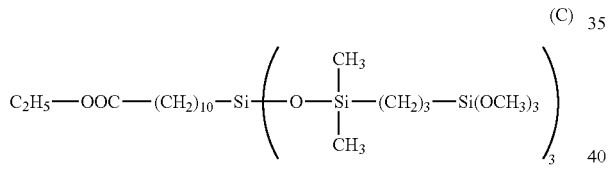
(C)

$^1$H-NMR
δ 0.1-0.2 (—Si-C$\underline{H}_3$) 18H
δ 0.5 (—(CH$_2$)$_7$C$\underline{H}_2$—Si(O—Si(CH$_3$)$_2$—)$_3$) 2H
δ 0.6-0.8 (—SiCH$_2$CH$_2$C$\underline{H}_2$—Si(OCH$_3$)$_3$, —SiC$\underline{H}_2$CH$_2$CH$_2$—Si(OCH$_3$)$_3$) 12H
δ 1.2-1.4 (—(C$\underline{H}_2$)$_7$—, —OCH$_2$C$\underline{H}_3$) 17H
δ 1.5 (—SiCH$_2$C$\underline{H}_2$CH$_2$—Si(OCH$_3$)$_3$) 6H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$CH$_2$CH$_2$—Si(OC$\underline{H}_3$)$_3$) 27H
δ 4.1 (—OC$\underline{H}_2$CH$_3$) 2H Synthesis Example 2

A reactor was charged with 45.7 g (2.35×10$^{-1}$ mol) of 1,4-bis(dimethylsilyl)benzene, which was heated at 80° C. Then 1.0×10$^{-2}$ g of toluene solution of chloroplatinic acid/vinylsiloxane complex (containing 0.3×10$^{-6}$ mol of Pt) was added, after which 10.0 g (4.71×10$^{-2}$ mol) of ethyl undecenoate was added dropwise over 3 hours. This was followed by heating and stirring for 1 hour. The solvent and unreacted reactants were distilled off under reduced pressure, obtaining 18.0 g of a compound having the formula (D).

[Chem. 105]

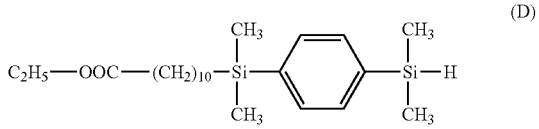
(D)

$^1$H-NMR
δ 0.2-0.4 (—Si-C$\underline{H}_3$) 12H
δ 0.7 (—(CH$_2$)$_7$C$\underline{H}_2$—Si—) 2H
δ 1.2-1.5 (—(C$\underline{H}_2$)$_7$—, —OCH$_2$C$\underline{H}_3$) 17H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 4.1 (—OC$\underline{H}_2$CH$_3$) 2H
δ 4.4 (—Si—$\underline{H}$) 1H
δ 7.5 (—Si-C$_6\underline{H}_4$—Si—) 4H A reactor was charged with 10.0 g (2.46×10$^{-2}$ mol) of the compound having formula (D).

[Chem. 106]

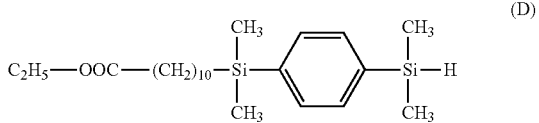
(D)

It was heated at 80° C. Then 1.0×10$^{-2}$ g of toluene solution of chloroplatinic acid/vinylsiloxane complex (containing 0.3×10$^{-6}$ mol of Pt) was added, after which 8.00 g (4.92×10$^{-2}$ mol) of allyltrimethoxysilane was added dropwise. This was followed by heating and stirring for 3 hours. The solvent and unreacted reactants were distilled off under reduced pressure, obtaining 13.1 g of a compound having the formula (E).

[Chem. 107]

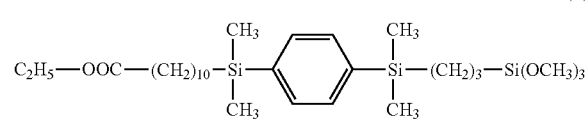
(E)

$^1$H-NMR
δ 0.2-0.3 (—Si-C$\underline{H}_3$) 12H
δ 0.7 (—(CH$_2$)$_7$C$\underline{H}_2$—Si—, —SiC$\underline{H}_2$CH$_2$CH$_2$—Si(OCH$_3$)$_3$) 4H
δ 0.8 (—SiCH$_2$CH$_2$C$\underline{H}_2$—Si(OCH$_3$)$_3$) 2H
δ 1.2-1.4 (—(C$\underline{H}_2$)$_7$—, —OCH$_2$C$\underline{H}_3$) 17H
δ 1.5 (—SiCH$_2$C$\underline{H}_2$CH$_2$—Si(OCH$_3$)$_3$) 2H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$CH$_2$CH$_2$—Si(OC$\underline{H}_3$)$_3$) 9H
δ 4.1 (—OC$\underline{H}_2$CH$_3$) 2H
δ 7.5 (—Si—C$_6\underline{H}_4$—Si—) 4H Example 2

A reactor was charged with 5.3 g (4.0×10$^{-2}$ mol) of tetramethyldisiloxane, 4.3 g of 12N hydrochloric acid aqueous solution, and 5.0 g of 1,4-bis(trifluoromethyl)benzene, which were cooled at 0° C. Subsequently, 10.0 g (1.8×10.2 mol) of the compound having formula (E):

[Chem. 108]

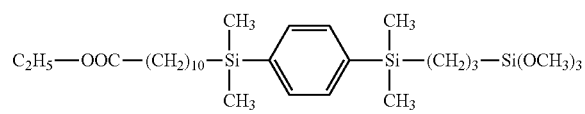
(E)

in Synthesis Example 2 was added dropwise to the mixture, which was aged at 0° C. for 6 hours. The lower layer was collected by separatory operation. The solvent and unreacted reactants were distilled off under reduced pressure, obtaining 8.2 g of a compound having the formula (F).

[Chem. 109]

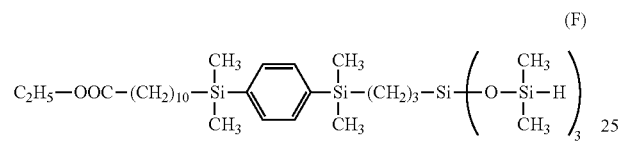
(F)

$^1$H-NMR
δ 0.1-0.2 (—Si—C$\underline{H}_3$) 30H
δ 0.5 (—(CH$_2$)$_7$C$\underline{H}_2$—Si(O—Si(CH$_3$)$_2$—)$_3$) 2H
δ 0.7-0.8 (—C$_6$H$_4$—Si—C$\underline{H}_2$—) 4H
δ 1.2-1.5 (—(C$\underline{H}_2$)$_7$—. —OC$\underline{H}_2$CH$_3$, —Si—CH$_2$C$\underline{H}_2$CH$_2$—Si—) 19H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 4.1 (—OC$\underline{H}_2$CH$_3$) 2H
δ 4.7 (—Si—$\underline{H}$) 3H
δ 7.5 (—Si—C$_6$$\underline{H}_4$—Si—) 4H A reactor was charged with 6.0 g (8.6×10$^{-3}$ mol) of the compound having formula (F).

[Chem. 110]

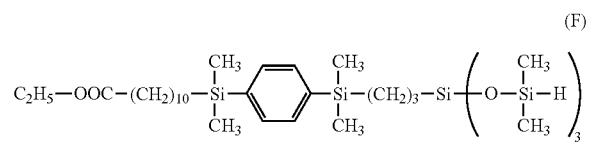
(F)

It was heated at 80° C. Then 5.0×10$^{-3}$ g of toluene solution of chloroplatinic acid/vinylsiloxane complex (containing 1.5×10$^{-7}$ mol of Pt) was added, after which 5.8 g (3.6×10$^{-2}$ mol) of allyltrimethoxysilane was added dropwise. This was followed by heating and stirring for 3 hours. The solvent and unreacted reactants were distilled off under reduced pressure, obtaining 9.4 g of a product (lipophilic group-containing hydrolyzable organosiloxane compound 2) having the formula (G).

[Chem. 111]

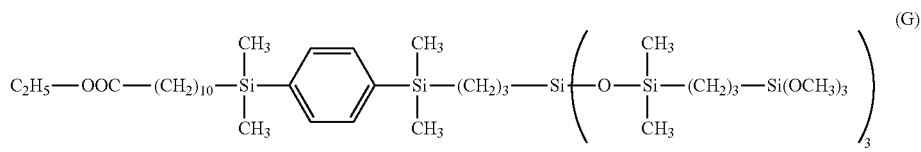
(G)

$^1$H-NMR
δ 0.1-0.2 (—Si—C$\underline{H}_3$) 30H
δ 0.5 (—(CH$_2$)$_7$C$\underline{H}_2$—Si(O—Si(CH$_3$)$_2$—)$_3$) 2H
δ 0.6-0.8 (—C$_6$H$_4$—Si—C$\underline{H}_2$—, —SiCH$_2$CH$_2$C$\underline{H}_2$—Si(OCH$_3$)$_3$, —SiC$\underline{H}_2$CH$_2$CH$_2$—Si(OCH$_3$)$_3$) 16H
δ 1.2-1.4 (—(C$\underline{H}_2$)$_7$—, —OCH$_2$C$\underline{H}_3$, —Si—CH$_2$C$\underline{H}_2$CH$_2$—Si—) 19H
δ 1.5 (—SiCH$_2$C$\underline{H}_2$CH$_2$—Si(OCH$_3$)$_3$) 6H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$CH$_2$CH$_2$—Si(OC$\underline{H}_3$)$_3$) 27H
δ 4.1 (—OC$\underline{H}_2$CH$_3$) 2H
δ 7.5 (—Si—C$_6$$\underline{H}_4$—Si—) 4H Synthesis Example 3

A reactor was charged with 10.0 g (2.46×10−2 mol) of the compound having formula (D).

[Chem. 112]

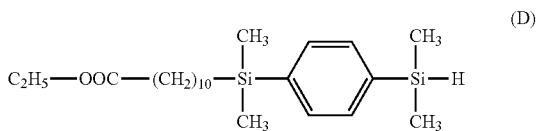
(D)

It was heated at 80° C. Then 1.0×10$^{-2}$ g of toluene solution of chloroplatinic acid/vinylsiloxane complex (containing 0.3×10$^{-6}$ mol of Pt) was added, after which 9.10 g (3.94×10$^{-2}$ mol) of 7-octenyltrimethoxysilane was added dropwise. This was followed by heating and stirring for 4 hours. The solvent and unreacted reactants were distilled off under reduced pressure, obtaining 14.0 g of a compound having the formula (H).

[Chem. 113]

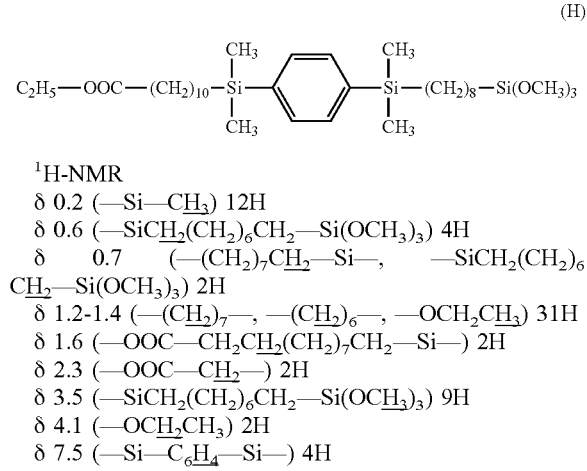
(H)

$^1$H-NMR
δ 0.2 (—Si—C$\underline{H}_3$) 12H
δ 0.6 (—SiC$\underline{H}_2$(CH$_2$)$_6$CH$_2$—Si(OCH$_3$)$_3$) 4H
δ 0.7 (—(CH$_2$)$_7$C$\underline{H}_2$—Si—, —SiCH$_2$(CH$_2$)$_6$C$\underline{H}_2$—Si(OCH$_3$)$_3$) 2H
δ 1.2-1.4 (—(C$\underline{H}_2$)$_7$—, —(C$\underline{H}_2$)$_6$—, —OCH$_2$C$\underline{H}_3$) 31H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$(CH$_2$)$_6$CH$_2$—Si(OC$\underline{H}_3$)$_3$) 9H
δ 4.1 (—OC$\underline{H}_2$CH$_3$) 2H
δ 7.5 (—Si—C$_6$$\underline{H}_4$—Si—) 4H

Example 3

A reactor was charged with 3.3 g (2.5×10⁻² mol) of tetramethyldisiloxane, 2.6 g of 12N hydrochloric acid aqueous solution, and 3.5 g of 1,4-bis(trifluoromethyl)benzene, which were cooled at 0° C. Subsequently, 7.0 g (1.1×10⁻² mol) of the compound having formula (H):

[Chem. 114]

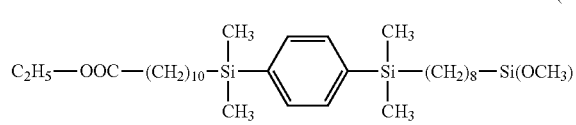

in Synthesis Example 3 was added dropwise to the mixture, which was aged at 0° C. for 6 hours. The lower layer was collected by separatory operation. The solvent and unreacted reactants were distilled off under reduced pressure, obtaining 5.6 g of a compound having the formula (I).

[Chem. 115]

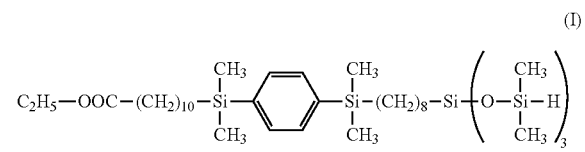

¹H-NMR
δ 0.1-0.2 (—Si—C$\underline{H}_3$) 30H
δ 0.5 (—(CH₂)₇C$\underline{H}_2$—Si(O—Si(CH₃)₂—)₃) 2H
δ 0.7-0.8 (—C₆H₄—Si—C$\underline{H}_2$—) 4H
δ 1.2-1.5 (—(C$\underline{H}_2$)₇—, —OCH₂C$\underline{H}_3$, —Si—CH₂(C$\underline{H}_2$)₆CH₂—Si—) 29H
δ 1.6 (—OOC—CH₂C$\underline{H}_2$(CH₂)₇CH₂—Si—) 2H
δ 2.3 (—OOC—C$\underline{H}_2$—) 2H
δ 4.1 (—OC$\underline{H}_2$CH₃) 2H
δ 4.7 (—Si—$\underline{H}$) 3H
δ 7.5 (—Si—C₆$\underline{H}_4$—Si—) 4H A reactor was charged with 3.0 g (3.9×10⁻³ mol) of the compound having formula (1).

[Chem. 116]

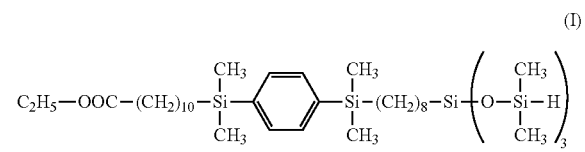

It was heated at 80° C. Then 2.5×10⁻³ g of toluene solution of chloroplatinic acid/vinylsiloxane complex (containing 7.5×10⁻⁸ mol of Pt) was added, after which 2.6 g (1.6×10⁻² mol) of allyltrimethoxysilane was added dropwise. This was followed by heating and stirring for 3 hours. The solvent and unreacted reactants were distilled off under reduced pressure, obtaining 4.2 g of a product (lipophilic group-containing hydrolyzable organosiloxane compound 3) having the formula (J).

[Chem. 117]

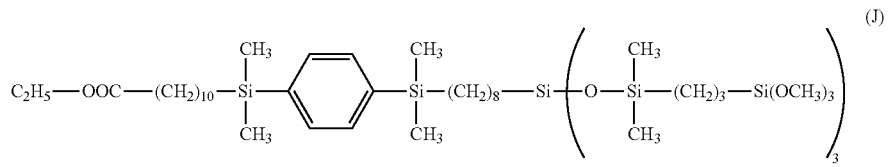

¹H-NMR
δ 0.1-0.2 (—Si—C$\underline{H}_3$) 30H
δ 0.5 (—(CH₂)₇C$\underline{H}_2$—Si(O—Si(CH₃)₂—)₃) 2H
δ 0.6-0.8 (—C₆H₄—Si—C$\underline{H}_2$—, —SiCH₂CH₂C$\underline{H}_2$—Si(OCH₃)₃, —SiC$\underline{H}_2$CH₂CH₂—Si(OCH₃)₃) 16H
δ 1.2-1.4 (—(C$\underline{H}_2$)₇—, —OCH₂C$\underline{H}_3$, —Si—CH₂(C$\underline{H}_2$)₆CH₂—Si—) 29H
δ 1.5 (—SiCH₂C$\underline{H}_2$CH₂—Si(OCH₃)₃) 6H
δ 1.6 (—OOC—CH₂C$\underline{H}_2$(CH₂)₇CH₂—Si—) 2H
δ 2.3 (—OOC—C$\underline{H}_2$—) 2H
δ 3.5 (—SiCH₂CH₂CH₂—Si(OC$\underline{H}_3$)₃) 27H
δ 4.1 (—OC$\underline{H}_2$CH₃) 2H
δ 7.5 (—Si—C₆$\underline{H}_4$—Si—) 4H

Synthesis Example 4

A reactor was charged with 31.6 g (2.35×10⁻¹ mol) of tetramethyldisiloxane, which was heated at 80° C. Then 1.0×10⁻² g of toluene solution of chloroplatinic acid/vinylsiloxane complex (containing 0.3×10⁻⁶ mol of Pt) was added, after which 10.0 g (4.71×10⁻² mol) of ethyl undecenoate was added dropwise over 3 hours. This was followed by heating and stirring for 1 hour. The solvent and unreacted reactants were distilled off under reduced pressure, obtaining 16.4 g of a compound having the formula (K).

[Chem. 118]

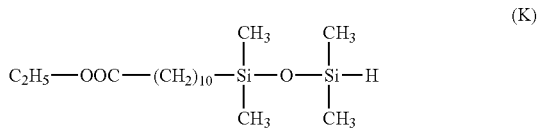

¹H-NMR
δ 0.2-0.4 (—Si—C$\underline{H}_3$) 12H
δ 0.7 (—(CH₂)₇C$\underline{H}_2$—Si—) 2H
δ 1.2-1.5 (—(C$\underline{H}_2$)₇—, —OCH₂C$\underline{H}_3$) 17H
δ 1.6 (—OOC—CH₂C$\underline{H}_2$(CH₂)₇CH₂—Si—) 2H
δ 2.3 (—OOC—C$\underline{H}_2$—) 2H
δ 4.1 (—OC$\underline{H}_2$CH₃) 2H
δ 4.4 (—Si—H) 1H A reactor was charged with 10.0 g (2.88×10⁻² mol) of the compound having formula (K).

[Chem. 119]

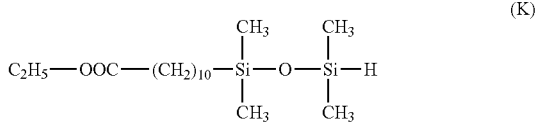
(K)

It was heated at 80° C. Then 1.0×10⁻² g of toluene solution of chloroplatinic acid/vinylsiloxane complex (containing 0.3×10⁻⁶ mol of Pt) was added, after which 9.4 g (4.04×10⁻² mol) of 7-octenyltrimethoxysilane was added dropwise. This was followed by heating and stirring for 3 hours. The solvent and unreacted reactants were distilled off under reduced pressure, obtaining 15.1 g of a compound having the formula (L).

[Chem. 120]

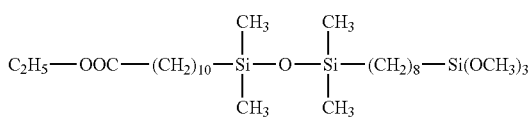
(L)

¹H-NMR
δ 0.2-0.3 (—Si—C$\underline{H}_3$) 12H
δ 0.7 (—(CH$_2$)$_7$C$\underline{H}_2$—Si—, —SiC$\underline{H}_2$ (CH$_2$)$_6$CH$_2$—Si(OCH$_3$)$_3$) 4H
δ 0.8 (—SiCH$_2$(CH$_2$)$_6$C$\underline{H}_2$—Si(OCH$_3$)$_3$) 2H
δ 1.2-1.4 (—(C$\underline{H}_2$)$_7$—, —SiCH$_2$(C$\underline{H}_2$)$_6$CH$_2$—Si(OCH$_3$)$_3$, —OCH$_2$C$\underline{H}_3$) 29H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$(C$\underline{H}_2$)$_6$CH$_2$—Si(OC$\underline{H}_3$)$_3$) 9H
δ 4.1 (—OC$\underline{H}_2$CH$_3$) 2H Example 4

A reactor was charged with 5.1 g (3.8·10⁻² mol) of tetramethyldisiloxane, 4.1 g of 12N hydrochloric acid aqueous solution, and 5.0 g of 1,4-bis(trifluoromethyl)benzene, which were cooled at 0° C. Subsequently, 10.0 g (1.7×10.2 mol) of the compound having formula (L):

[Chem. 121]

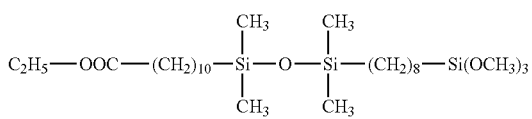
(L)

in Synthesis Example 4 was added dropwise to the mixture, which was aged at 0° C. for 6 hours. The lower layer was collected by separatory operation. The solvent and unreacted reactants were distilled off under reduced pressure, obtaining 8.6 g of a compound having the formula (M).

[Chem. 122]

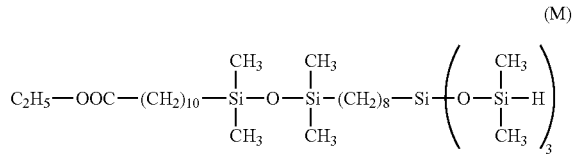
(M)

¹H-NMR
δ 0.1-0.2 (—Si—C$\underline{H}_3$) 30H
δ 0.5-0.6 (—O—Si(CH$_3$)$_2$—C$\underline{H}_2$—) 6H
δ 1.2-1.5 (—(C$\underline{H}_2$)$_7$—, —OCH$_2$C$\underline{H}_3$, —Si—CH$_2$(C$\underline{H}_2$)$_6$CH$_2$—Si—) 29H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 4.1 (—OC$\underline{H}_2$CH$_3$) 2H
δ 4.7 (—Si—H) 3H A reactor was charged with 5.0 g (7.0×10⁻³ mol) of the compound having formula (M).

[Chem. 123]

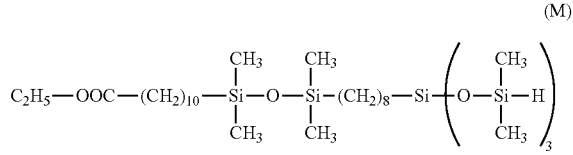
(M)

It was heated at 80° C. Then 5.0×10⁻³ g of toluene solution of chloroplatinic acid/vinylsiloxane complex (containing 1.5×10⁻⁷ mol of Pt) was added, after which 4.6 g (2.8×10⁻² mol) of allyltrimethoxysilane was added dropwise. This was followed by heating and stirring for 3 hours. The solvent and unreacted reactants were distilled off under reduced pressure, obtaining 6.7 g of a product (lipophilic group-containing hydrolyzable organosiloxane compound 4) having the formula (N).

[Chem. 124]

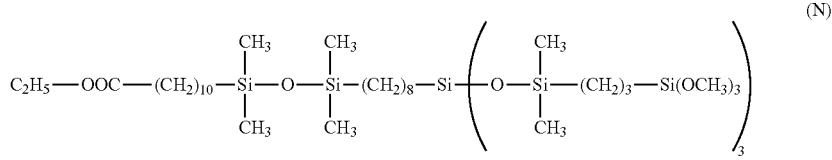
(N)

¹H-NMR
δ 0.1-0.2 (—Si—CH₃) 30H
δ 0.5-0.7 (—O—Si(CH₃)₂—CH₂—, —SiCH₂CH₂CH₂—Si(OCH₃)₃, —SiCH₂CH₂CH₂—Si(OCH₃)₃) 18H
δ 1.2-1.4 (—(CH₂)₇—, —OCH₂CH₃, —Si—CH₂(CH₂)CH₂—Si—) 29H
δ 1.5 (—SiCH₂CH₂CH₂—Si(OCH₃)₃) 6H
δ 1.6 (—OOC—CH₂CH₂(CH₂)₇CH₂—Si—) 2H
δ 2.3 (—OOC—CH₂—) 2H
δ 3.5 (—SiCH₂CH₂CH₂—Si(OCH₃)₃) 27H
δ 4.1 (—OCH₂CH₃) 2H

Example 5

A reactor was charged with 5.0 g (1.1×10⁻² mol) of the compound having formula (B):

[Chem. 125]

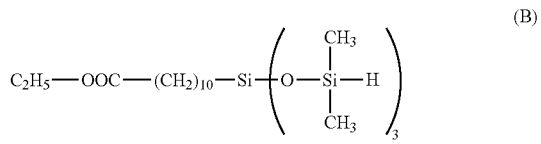

in Example 1, which was heated at 80° C. Then 5.0×10⁻³ g of toluene solution of chloroplatinic acid/vinylsiloxane complex (containing 1.5×10⁻⁷ mol of Pt) was added, after which 10.0 g (4.3×10–2 mol) of 7-octenyltrimethoxysilane was added dropwise. This was followed by heating and stirring for 3 hours. The solvent and unreacted reactants were distilled off under reduced pressure, obtaining 11.0 g of a product (lipophilic group-containing hydrolyzable organosiloxane compound 5) having the formula (O).

[Chem. 126]

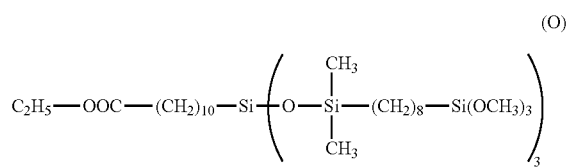

¹H-NMR
δ 0.1-0.2 (—Si—CH₃) 18H
δ 0.5 (—(CH₂)₇CH₂—Si(O—Si(CH₃)₂—)₃) 2H
δ 0.6-0.8 (—SiCH₂(CH₂)₆CH₂—Si(OCH₃)₃, —SiCH₂(CH₂)₆CH₂—Si(OCH₃)₃) 12H
δ 1.2-1.4 (—(CH₂)₇—, —OCH₂CH₃) 17H
δ 1.5 (—SiCH₂(CH₂)₆CH₂—Si(OCH₃)₃) 36H
δ 1.6 (—OOC—CH₂CH₂(CH₂)₇CH₂—Si—) 2H
δ 2.3 (—OOC—CH₂—) 2H
δ 3.5 (—SiCH₂CH₂CH₂—Si(OCH₃)₃) 27H
δ 4.1 (—OCH₂CH₃) 2H

Example 6

A reactor was charged with 10.0 g (1.4×10.2 mol) of the compound having formula (F):

[Chem. 127]

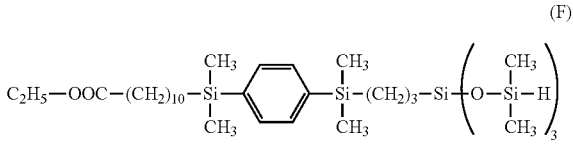

in Example 2, which was heated at 80° C. Then 1.0×10⁻² g of toluene solution of chloroplatinic acid/vinylsiloxane complex (containing 0.3×10⁻⁶ mol of Pt) was added, after which 13.4 g (5.8×10⁻² mol) of 7-octenyltrimethoxysilane was added dropwise. This was followed by heating and stirring for 3 hours. The solvent and unreacted reactants were distilled off under reduced pressure, obtaining 15.4 g of a product (lipophilic group-containing hydrolyzable organosiloxane compound 6) having the formula (P).

[Chem. 128]

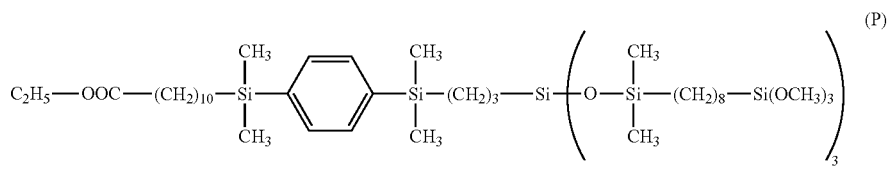

¹H-NMR
δ 0.1-0.2 (—Si—CH₃) 30H
δ 0.5 (—(CH₂)₇CH₂—Si(O—Si(CH₃)₂—)₃) 2H
δ 0.6-0.8 (—C₆H₄—Si—CH₂—, —SiCH₂(CH₂)₆CH₂—Si(OCH₃)₃, —SiCH₂(CH₂)₆CH₂—Si(OCH₃)₃) 16H
δ 1.2-1.4 (CH₂)₇—, —OCH₂CH₃) 17H
δ 1.5 (—SiCH₂(CH₂)₆CH₂—Si(OCH₃)₃) 36H
δ 1.6 (—OOC—CH₂CH₂(CH₂)₇CH₂—Si—) 2H
δ 2.3 (—OOC—CH₂—) 2H
δ 3.5 (—SiCH₂CH₂CH₂—Si(OCH₃)₃) 27H
δ 4.1 (—OCH₂CH₃) 2H
δ 7.5 (—Si—C₆H₄—Si—) 4H

Example 7

A reactor was charged with 1.8 g (2.3×10−3 mol) of the compound having formula (I):

[Chem. 129]

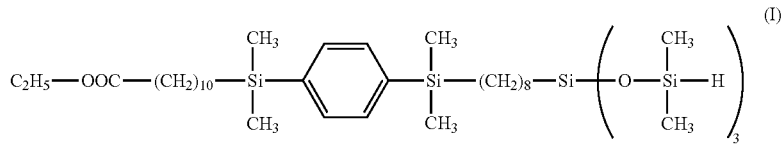
(I)

in Example 3, which was heated at 80° C. Then $2.0\times10^{-3}$ g of toluene solution of chloroplatinic acid/vinylsiloxane complex (containing $6.0\times10^{-8}$ mol of Pt) was added, after which 2.3 g ($9.8\times10^{-3}$ mol) of 7-octenyltrimethoxysilane was added dropwise. This was followed by heating and stirring for 3 hours. The solvent and unreacted reactants were distilled off under reduced pressure, obtaining 2.7 g of a product (lipophilic group-containing hydrolyzable organosiloxane compound 7) having the formula (Q).

[Chem. 130]

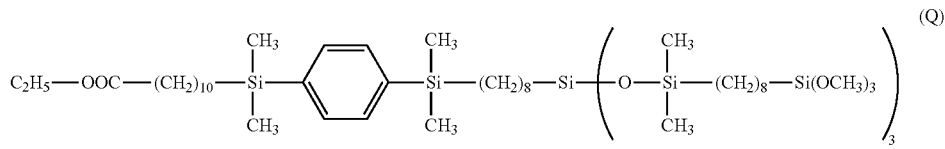
(Q)

$^1$H-NMR
δ 0.1-0.2 (—Si—C$\underline{H}_3$) 30H
δ 0.5 (—(CH$_2$)$_7$C$\underline{H}_2$—Si(O—Si(CH$_3$)$_2$—)$_3$) 2H
δ 0.6-0.8 (—C$_6$H$_4$—Si—C$\underline{H}_2$—, —SiC$\underline{H}_2$(CH$_2$)$_6$CH$_2$—Si(OCH$_3$)$_3$, —SiC$\underline{H}_2$(CH$_2$)$_6$CH$_2$—Si(OCH$_3$)$_3$) 16H
δ 1.2-1.4 (C$\underline{H}_2$)$_7$—, —OCH$_2$C$\underline{H}_3$) 17H
δ 1.5 (—SiCH$_2$(C$\underline{H}_2$)$_6$CH$_2$—Si(OCH$_3$)$_3$) 36H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$CH$_2$CH$_2$—Si(OC$\underline{H}_3$)$_3$) 27H
δ 4.1 (—OC$\underline{H}_2$CH$_3$) 2H
δ 7.5 (—Si—C$_6$$\underline{H}_4$—Si—) 4H

Example 8

A reactor was charged with 5.0 g ($7.0\times10^3$ mol) of the compound having formula (M):

[Chem. 131]

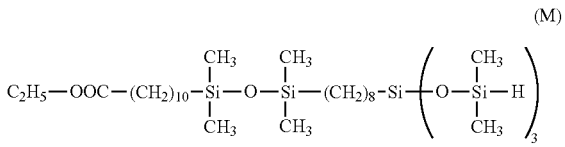
(M)

in Example 4, which was heated at 80° C. Then $5.0\times10^{-3}$ g of toluene solution of chloroplatinic acid/vinylsiloxane complex (containing $1.5\times10^{-7}$ mol of Pt) was added, after which 6.5 g ($2.8\times10^{-2}$ mol) of 7-octenyltrimethoxysilane was added dropwise. This was followed by heating and stirring for 3 hours. The solvent and unreacted reactants were distilled off under reduced pressure, obtaining 7.6 g of a product (lipophilic group-containing hydrolyzable organosiloxane compound 8 having the formula (R).

[Chem. 132]

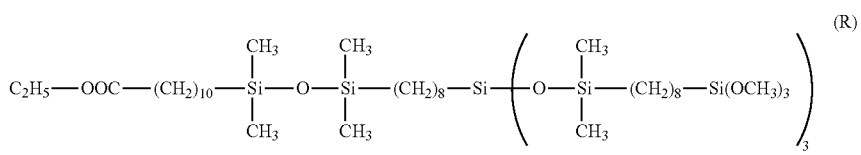
(R)

¹H-NMR
δ 0.1-0.2 (—Si—C$\underline{H}_3$) 30H
δ 0.5-0.7 (—O—Si(C$\underline{H}_3$)$_2$—C$\underline{H}_2$—, —SiC$\underline{H}_2$(CH$_2$)$_6$CH$_2$—Si(OCH$_3$)$_3$, —SiC$\underline{H}_2$)$_6$CH$_2$—Si(OCH$_3$)$_3$) 18H
δ 1.2-1.4 (—(C$\underline{H}_2$)$_7$—, —OC$\underline{H}_2$CH$_3$) 17H
δ 1.5 (—SiCH$_2$(C$\underline{H}_2$)$_6$CH$_2$—Si(OCH$_3$)$_3$) 36H
δ 1.6 (—OOC—C$\underline{H}_2$CH$_2$(CH$_2$)$_7$CH$_2$—Si—) 2H
δ 2.3 (—OOC—C$\underline{H}_2$—) 2H
δ 3.5 (—SiCH$_2$CH$_2$CH$_2$—Si(OC$\underline{H}_3$)$_3$) 27H
δ 4.1 (—OC$\underline{H}_2$CH$_3$) 2H Synthesis Example 5

A reactor was charged with 40.6 g (2.09×10⁻¹ mol) of 1,4-bis(dimethylsilyl)benzene, which was heated at 80° C. Then 1.0×10⁻² g of toluene solution of chloroplatinic acid-vinylsiloxane complex (containing 0.3×10⁻⁶ mol of Pt) was added, after which 10.0 g (4.18×10⁻² mol) of a compound having the formula (S):

[Chem. 133]

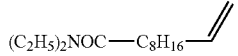
(S)

was added dropwise over 3 hours. This was followed by heating and stirring for 6 hours. The solvent and unreacted reactants were distilled off under reduced pressure, obtaining 17.1 g of a compound having the formula (T).

[Chem. 134]

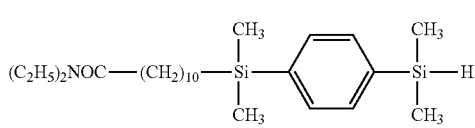
(T)

¹H-NMR
δ 0.2-0.4 (—Si—C$\underline{H}_3$) 12H
δ 0.7 (—(CH$_2$)$_7$C$\underline{H}_2$—Si—) 2H
δ 1.0-1.2 (—N(C$\underline{H}_2$CH$_3$)$_2$) 6H
δ 1.2-1.5 (—(C$\underline{H}_2$)$_7$—) 14H
δ 1.6 (—NOC—C$\underline{H}_2$CH$_2$(CH$_2$)$_7$CH$_2$—Si—) 2H
δ 2.3 (—NOC—C$\underline{H}_2$—) 2H
δ 3.2-3.4 (—N(C$\underline{H}_2$CH$_3$)$_2$) 4H
δ 4.4 (—Si—H) 1H
δ 7.5 (—Si—C$_6$$\underline{H}_4$—Si—) 4H A reactor was charged with 10.0 g (2.31×10⁻² mol) of the compound having formula (T).

[Chem. 135]

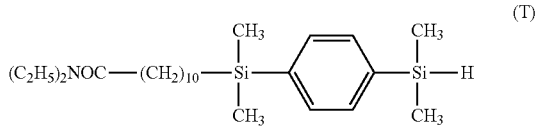
(T)

It was heated at 80° C. Then 1.0×10⁻² g of toluene solution of chloroplatinic acid/vinylsiloxane complex (containing 0.3×10⁻⁶ mol of Pt) was added, after which 7.5 g (3.23×10⁻² mol) of 7-octenyltrimethoxysilane was added dropwise. This was followed by heating and stirring for 6 hours. The solvent and unreacted reactants were distilled off under reduced pressure, obtaining 12.6 g of a compound having the formula (U).

[Chem. 136]

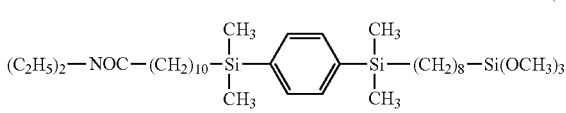
(U)

¹H-NMR
δ 0.2-0.3 (—Si—C$\underline{H}_3$) 12H
δ 0.7 (—(CH$_2$)$_7$C$\underline{H}_2$—Si—, —SiC$\underline{H}_2$CH$_2$CH$_2$—Si(OCH$_3$)$_3$) 4H
δ 0.8 (—SiCH$_2$CH$_2$C$\underline{H}_2$—Si(OCH$_3$)$_3$) 2H
δ 1.0-1.2 (—N(CH$_2$C$\underline{H}_3$)$_2$) 6H
δ 1.2-1.4 (—(C$\underline{H}_2$)$_7$—) 14H
δ 1.5 (—SiCH$_2$C$\underline{H}_2$CH$_2$—Si(OCH$_3$)$_3$) 2H
δ 1.6 (—NOC—C$\underline{H}_2$CH$_2$(CH$_2$)$_7$CH$_2$—Si—) 2H
δ 2.3 (—NOC—C$\underline{H}_2$—) 2H
δ 3.2-3.4 (—N(C$\underline{H}_2$CH$_3$)$_2$) 4H
δ 3.5 (—SiCH$_2$CH$_2$CH$_2$—Si(OC$\underline{H}_3$)$_3$) 9H
δ 7.5 (—Si—C$_6$$\underline{H}_4$—Si—) 4H Example 9

A reactor was charged with 4.5 g (3.4×10⁻² mol) of tetramethyldisiloxane, 3.6 g of 12N hydrochloric acid aqueous solution, and 5.0 g of 1,4-bis(trifluoromethyl)benzene, which were cooled at 0° C. Subsequently, 10.0 g (1.5×10⁻² mol) of the compound having formula (U):

[Chem. 137]

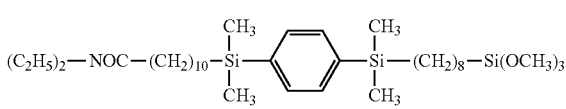
(U)

in Synthesis Example 5 was added dropwise to the mixture, which was aged at 0° C. for 6 hours. The lower layer was collected by separatory operation. The solvent and unreacted reactants were distilled off under reduced pressure, obtaining 8.6 g of a compound having the formula (V).

[Chem. 138]

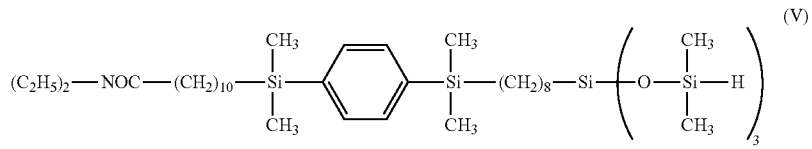
(V)

¹H-NMR
δ 0.1-0.2 (—Si—C$\underline{H}_3$) 30H
δ 0.5 (—(CH$_2$)$_7$C$\underline{H}_2$—Si(O—Si(CH$_3$)$_2$—)$_3$) 2H
δ 0.7-0.8 (—C$_6$H$_4$—Si—C$\underline{H}_2$—) 4H
δ 1.0-1.2 (—N(CH$_2$C$\underline{H}_3$)$_2$) 6H
δ 1.2-1.5 (—(C$\underline{H}_2$)$_7$—, —Si—CH$_2$(C$\underline{H}_2$)$_6$CH$_2$—Si—) 26H
δ 1.6 (—NOC—CH$_2$C$\underline{H}_2$(CH$_2$)$_7$CH$_2$—Si—) 2H
δ 2.3 (—NOC—C$\underline{H}_2$—) 2H
δ 3.2-3.4 (—N(C$\underline{H}_2$CH$_3$)$_2$) 4H
δ 4.7 (—Si—H) 3H
δ 7.5 (—Si—C$_6$$\underline{H}_4$—Si—) 4H A reactor was charged with 5.0 g (6.3×10⁻³ mol) of the compound having formula (V).

[Chem. 139]

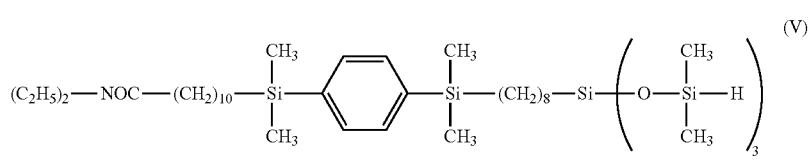

(V)

It was heated at 80° C. Then 5.0×10⁻³ g of toluene solution of chloroplatinic acid/vinylsiloxane complex (containing 1.5×10⁻⁷ mol of Pt) was added, after which 5.9 g (2.5×10⁻² mol) of 7-octenyltrimethoxysilane was added dropwise. This was followed by heating and stirring for 3 hours. The solvent and unreacted reactants were distilled off under reduced pressure, obtaining 8.1 g of a product (lipophilic group-containing hydrolyzable organosiloxane compound 9) having the formula (W).

[Chem. 140]

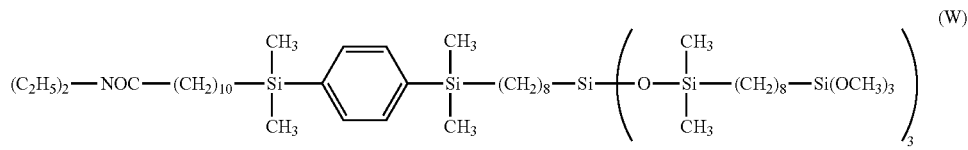

(W)

¹H-NMR
δ 0.1-0.2 (—Si—C$\underline{H}_3$) 30H
δ 0.5 (—(CH$_2$)$_7$C$\underline{H}_2$—Si(O—Si(CH$_3$)$_2$—)$_3$) 2H
δ 0.6-0.8 (—C$_6$H$_4$—Si—C$\underline{H}_2$—, —SiCH$_2$CH$_2$C$\underline{H}_2$—Si(OCH$_3$)$_3$, —SiC$\underline{H}_2$CH$_2$CH$_2$—Si(OCH$_3$)$_3$) 16H
δ 1.0-1.2 (—N(CH$_2$C$\underline{H}_3$)$_2$) 6H
δ 1.2-1.4 (—(C$\underline{H}_2$)$_7$—, —Si—CH$_2$(C$\underline{H}_2$)$_6$CH$_2$—Si—) 26H
δ 1.5 (—SiCH$_2$C$\underline{H}_2$CH$_2$—Si(OCH$_3$)$_3$) 6H
δ 1.6 (—NOC—CH$_2$C$\underline{H}_2$(CH$_2$)$_7$CH$_2$—Si—) 2H
δ 2.3 (—NOC—C$\underline{H}_2$—) 2H
δ 3.2-3.4 (—N(C$\underline{H}_2$CH$_3$)$_2$) 4H
δ 3.5 (—SiCH$_2$CH$_2$CH$_2$—Si(OC$\underline{H}_3$)$_3$) 27H
δ 7.5 (—Si—C$_6$$\underline{H}_4$—Si—) 4H Synthesis Example 6

A reactor was charged with 13.8 g (9.42×10⁻² mol) of 1,2-bis(dimethylsilyl)ethane, which was heated at 80° C. Then 1.0×10⁻² g of toluene solution of chloroplatinic acid/vinylsiloxane complex (containing 0.3×10⁻⁶ mol of Pt) was added, after which 4.0 g (1.89×10⁻² mol) of ethyl undecenoate was added dropwise over 3 hours. This was followed by heating and stirring for 1 hour. The solvent and unreacted reactants were distilled off under reduced pressure, obtaining 6.5 g of a compound having the formula (X).

[Chem. 141]

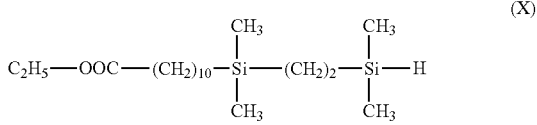

(X)

¹H-NMR
δ 0.2-0.4 (—Si—C$\underline{H}_3$) 12H
δ 0.7 (—C$\underline{H}_2$—Si—) 6H
δ 1.2-1.5 (—(C$\underline{H}_2$)$_7$—, —OCH$_2$C$\underline{H}_3$) 17H
δ 1.6 (—OOC—CH$_2$C$\underline{H}_2$(CH$_2$)?CH$_2$—Si—) 2H
δ 2.3 (—OOC—C$\underline{H}_2$—) 2H
δ 4.1 (—OC$\underline{H}_2$CH$_3$) 2H
δ 4.4 (—Si—H) 1H A reactor was charged with 6.0 g (1.67×10⁻² mol) of the compound having formula (X).

[Chem. 142]

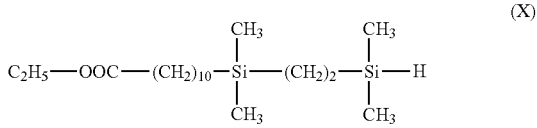

(X)

It was heated at 80° C. Then 1.0×10⁻² g of toluene solution of chloroplatinic acid/vinylsiloxane complex (containing 0.3×10⁻⁶ mol of Pt) was added, after which 5.5 g (2.34×10⁻² mol) of 7-octenyltrimethoxysilane was added dropwise. This was followed by heating and stirring for 3 hours. The solvent and unreacted reactants were distilled off under reduced pressure, obtaining 8.0 g of a compound having the formula (Y).

[Chem. 143]

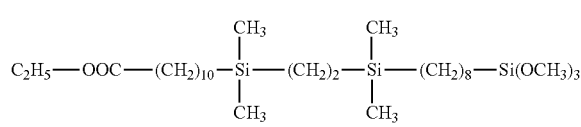
(Y)

¹H-NMR
δ 0.2 (—Si—CH₃) 12H
δ 0.6 (—CH₂—Si—,) 8H
δ 0.7 (—CH₂—Si(OCH₃)₃) 2H
δ 1.2-1.4 (—(CH₂)₇—, —(CH₂)₆—, —OCH₂CH₃) 31H
δ 1.6 (—OOC—CH₂CH₂(CH₂)₇CH₂—Si—) 2H
δ 2.3 (—OOC—CH₂—) 2H
δ 3.5 (—SiCH₂(CH₂)₆CH₂—Si(OCH₃)₃) 9H
δ 4.1 (—OCH₂CH₃) 2H

Example 10

A reactor was charged with 5.3 g (4.0×10⁻² mol) of tetramethyldisiloxane, 4.3 g of 12N hydrochloric acid aqueous solution, and 5.0 g of 1,4-bis(trifluoromethyl)benzene, which were cooled at 0° C. Subsequently, 6.0 g (1.02×10⁻² mol) of the compound having formula (Y):

[Chem. 144]

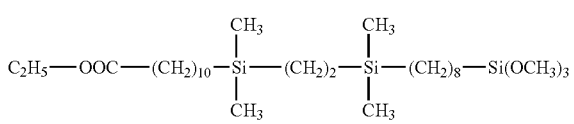
(Y)

in Synthesis Example 6 was added dropwise to the mixture, which was aged at 0° C. for 6 hours. The lower layer was collected by separatory operation. The solvent and unreacted reactants were distilled off under reduced pressure, obtaining 5.5 g of a compound having the formula (Z).

[Chem. 145]

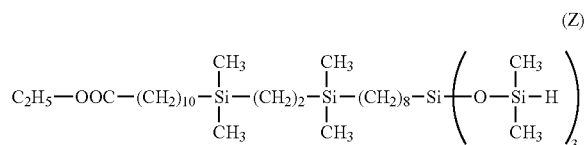
(Z)

¹H-NMR
δ 0.1-0.2 (—Si—CH₃) 30H
δ 0.5 (—(CH₂)₇CH₂—Si(O—Si(CH₃)₂—)₃) 2H
δ 0.7-0.8 (—Si—CH₂—) 8H
δ 1.2-1.5 (—(CH₂)₇—, —OCH₂CH₃, —Si—CH₂(CH₂)₆CH₂—Si—) 29H
δ 1.6 (—OOC—CH₂CH₂(CH₂)₇CH₂—Si—) 2H
δ 2.3 (—OOC—CH₂—) 2H
δ 4.1 (—OCH₂CH₃) 2H
δ 4.7 (—Si—H) 3H

A reactor was charged with 5.0 g (7.1×10⁻³ mol) of the compound having formula (Z).

[Chem. 146]

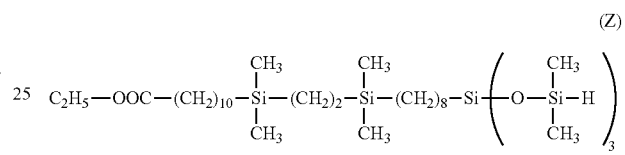
(Z)

It was heated at 80° C. Then 5.0×10⁻³ g of toluene solution of chloroplatinic acid/vinylsiloxane complex (containing 1.5×10⁻⁷ mol of Pt) was added, after which 5.8 g (2.5×10⁻² mol) of 7-octenyltrimethoxysilane was added dropwise. This was followed by heating and stirring for 3 hours. The solvent and unreacted reactants were distilled off under reduced pressure, obtaining 7.7 g of a product (lipophilic group-containing hydrolyzable organosiloxane compound 10) having the formula (AA).

[Chem. 147]

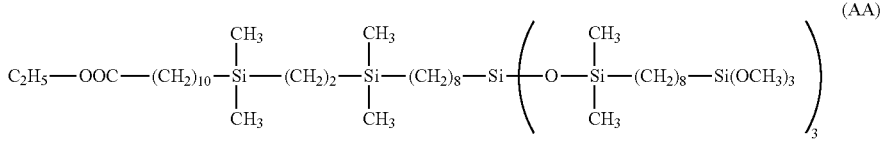
(AA)

¹H-NMR
δ 0.1-0.2 (—Si—CH₃) 30H
δ 0.5 (—(CH₂)₇CH₂—Si(O—Si(CH₃)₂—)₃) 2H
δ 0.6-0.8 (—Si—CH₂—, —₆CH₂—Si(OCH₃)₃) 20H
δ 1.2-1.4 (—(CH₂)₇—, —OCH₂CH₃) 17H
δ 1.5 (—SiCH₂(CH₂)₆CH₂—Si(OCH₃)₃) 36H
δ 1.6 (—OOC—CH₂CH₂(CH₂)₇CH₂—Si—) 2H
δ 2.3 (—OOC—CH₂—) 2H
δ 3.5 (—SiCH₂CH₂CH₂—Si(OCH₃)₃) 27H
δ 4.1 (—OCH₂CH₃) 2H

Synthesis Example 7

A reactor was charged with 10.0 g (4.34×10⁻² mol) of 1,8-bis(dimethylsilyl)octane, which was heated at 80° C. Then 1.0×10⁻² g of toluene solution of chloroplatinic acid/vinylsiloxane complex (containing 0.3×10⁻⁶ mol of Pt) was added, after which 1.9 g (8.96×10$^{-3}$ mol) of ethyl undecenoate was added dropwise over 3 hours. This was followed by heating and stirring for 1 hour. The solvent and unreacted reactants were distilled off under reduced pressure, obtaining 4.1 g of a compound having the formula (AB).

[Chem. 148]

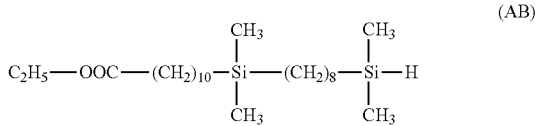

(AB)

$^1$H-NMR
δ 0.2-0.4 (—Si—C<u>H</u>$_3$) 12H
δ 0.7 (—C<u>H</u>$_2$—Si—) 6H
δ 1.2-1.5 (—(C<u>H</u>$_2$)$_7$—, —OCH$_2$C<u>H</u>$_3$) 29H
δ 1.6 (—OOC—CH$_2$C<u>H</u>$_2$(CH$_2$)$_7$CH$_2$—Si—) 2H
δ 2.3 (—OOC—C<u>H</u>$_2$—) 2H
δ 4.1 (—OC<u>H</u>$_2$CH$_3$) 2H
δ 4.4 (—Si—<u>H</u>) 1H

A reactor was charged with 4.0 g (9.03×10$^{-3}$ mol) of the compound having formula (AB).

[Chem. 149]

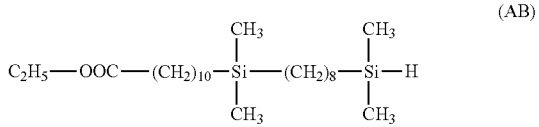

(AB)

It was heated at 80° C. Then 1.0×10$^{-2}$ g of toluene solution of chloroplatinic acid/vinylsiloxane complex (containing 0.3×10$^{-6}$ mol of Pt) was added, after which 2.9 g (1.26×10$^{-2}$ mol) of 7-octenyltrimethoxysilane was added dropwise. This was followed by heating and stirring for 3 hours. The solvent and unreacted reactants were distilled off under reduced pressure, obtaining 5.0 g of a compound having the formula (AC).

[Chem. 150]

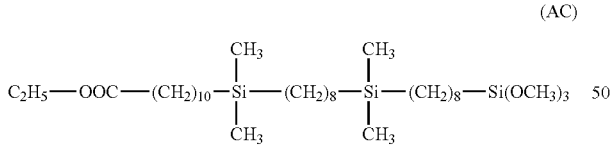

(AC)

$^1$H-NMR
δ 0.2 (—Si—C<u>H</u>$_3$) 12H
δ 0.6 (—C<u>H</u>$_2$—Si—,) 8H
δ 0.7 (—C<u>H</u>$_2$—Si(OCH$_3$)$_3$) 2H
δ 1.2-1.4 (—(C<u>H</u>$_2$)$_7$—, —(C$_2$)$_6$—, —OCH$_2$C<u>H</u>$_3$) 43H
δ 1.6 (—OOC—CH$_2$C<u>H</u>$_2$(CH$_2$)$_7$CH$_2$—Si—) 2H
δ 2.3 (—OOC—C<u>H</u>$_2$—) 2H
δ 3.5 (—SiCH$_2$(C<u>H</u>$_2$)$_6$CH$_2$—Si(OC<u>H</u>$_3$)$_3$) 9H
δ 4.1 (—OC<u>H</u>$_2$H$_3$) 2H

Example 11

A reactor was charged with 1.8 g (1.36×10$^{-2}$ mol) of tetramethyldisiloxane, 1.5 g of 12N hydrochloric acid aqueous solution, and 5.0 g of 1,4-bis(trifluoromethyl)benzene, which were cooled at 0° C. Subsequently, 4.0 g (5.92×10$^{-3}$ mol) of the compound having formula (AC):

[Chem. 151]

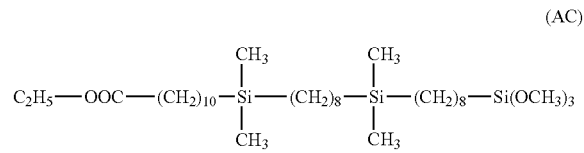

(AC)

in Synthesis Example 7 was added dropwise to the mixture, which was aged at 0° C. for 6 hours. The lower layer was collected by separatory operation. The solvent and unreacted reactants were distilled off under reduced pressure, obtaining 3.3 g of a compound having the formula (AD).

[Chem. 152]

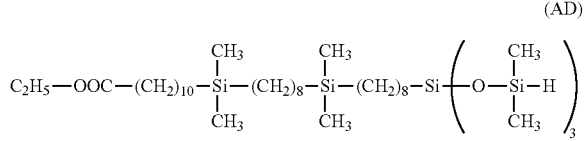

(AD)

$^1$H-NMR
δ 0.1-0.2 (—Si—C<u>H</u>$_3$) 30H
δ 0.5 (—(CH$_2$)$_7$C<u>H</u>$_2$—Si(O—Si(CH$_3$)$_2$—)$_3$) 2H
δ 0.7-0.8 (—Si—C<u>H</u>$_2$—) 8H
δ 1.2-1.5 (—(C<u>H</u>$_2$)$_7$—, —OCH$_2$C<u>H</u>$_3$, —Si—CH$_2$(C<u>H</u>$_2$)$_6$CH$_2$—Si—) 41H
δ 1.6 (—OOC—CH$_2$C<u>H</u>$_2$(CH$_2$)$_7$CH$_2$—Si—) 2H
δ 2.3 (—OOC—C<u>H</u>$_2$—) 2H
δ 4.1 (—OC<u>H</u>$_2$CH$_3$) 2H
δ 4.7 (—Si—H) 3H

A reactor was charged with 2.0 g (2.48×10$^{-3}$ mol) of the compound having formula (AD).

[Chem. 153]

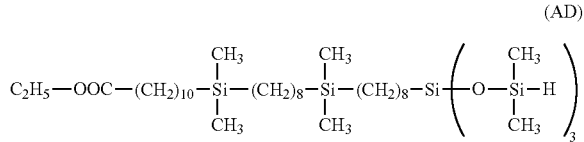

(AD)

It was heated at 80° C. Then 5.0×10$^{-3}$ g of toluene solution of chloroplatinic acid/vinylsiloxane complex (containing 1.5×10$^{-7}$ mol of Pt) was added, after which 3.4 g (1.47×10$^{-2}$ mol) of 7-octenyltrimethoxysilane was added dropwise. This was followed by heating and stirring for 3 hours. The solvent and unreacted reactants were distilled off under reduced pressure, obtaining 3.8 g of a product (lipophilic group-containing hydrolyzable organosiloxane compound 11) having the formula (AE).

[Chem. 154]

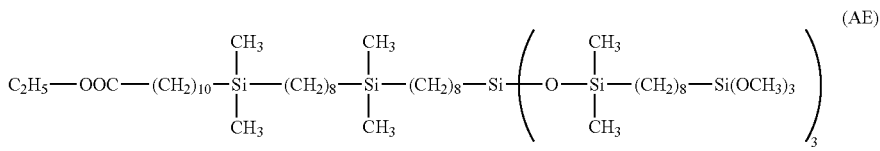

(AE)

¹H-NMR
δ 0.1-0.2 (—Si—C$\underline{H}_3$) 30H
δ 0.5 (—(CH$_2$)$_7$C$\underline{H}_2$—Si(O—Si(CH$_3$)$_2$—)$_3$) 2H
δ 0.6-0.8 (—Si—C$\underline{H}_2$—, —$_6$C$\underline{H}_2$—Si(OCH$_3$)$_3$) 20H
δ 1.2-1.4 (—(C$\underline{H}_2$)$_6$—, —(C$\underline{H}_2$)$_7$—, —OCH$_2$C$\underline{H}_3$) 29H
δ 1.5 (—SiCH$_2$(C$\underline{H}_2$)$_6$CH$_2$—Si(OCH$_3$)$_3$) 36H
δ 1.6 (—OOC—CH$_2$C$\underline{H}_2$(CH$_2$)$_7$CH$_2$—Si—) 2H
δ 2.3 (—OOC—C$\underline{H}_2$—) 2H
δ 3.5 (—SiCH$_2$CH$_2$CH$_2$—Si(OC$\underline{H}_3$)$_3$) 27H
δ 4.1 (—OC$\underline{H}_2$CH$_3$) 2H The following compounds were used in Comparative Examples.

Comparative Example 1

Lipophilic group-containing hydrolyzable organosilane compound 12 having the formula (AF)

[Chem. 155]

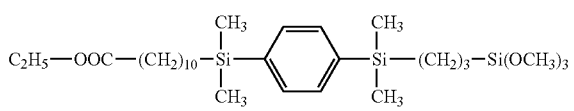

(AF)

Comparative Example 2

Hydrolyzable organosilane compound 13 having the formula (AG)

[Chem. 156]

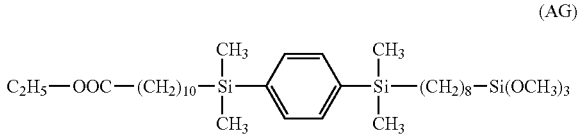

(AG)

Preparation of Surface Treating Agent and Formation of Cured Film

Surface treating agents were prepared by dissolving lipophilic group-containing hydrolyzable organosiloxane compounds 1 to 11 having formulae (C), (G), (J), (N), (O), (P), (Q), (R), (W), (AA), and (AE) obtained in Examples 1 to 11 and hydrolyzable organosilane compounds 12 and 13 having formulae (AF) and (AG) in Comparative Examples 1 and 2 in a concentration of 0.1 wt % and acetic acid in a concentration of 0.1 wt % in propylene glycol monomethyl ether. The surface treating agents were dip coated to Gorilla glass (Corning Inc.) and cured at 120° C. for 30 minutes to form cured films of 5 to 10 nm thick.

Evaluation of Low-Fingerprint-Visibility
[Evaluation of Fingerprint Visibility]

Sebum was deposited on the glass sample with the cured film, prepared above, under a load of 1 kg. Visibility was evaluated in 4 grades by a sensory test of visual observation. The results are shown in Table 1.
  4: fingerprints little visible
  3: fingerprints fairly visible
  2: fingerprints thinly, but definitely visible
  1: fingerprints definitely visible
[Evaluation of Haze]

Sebum was deposited on the glass sample with the cured film, prepared above, under a load of 1 kg. Haze was measured by a haze meter NDH 5000 (Nippon Denshoku Industries Co., Ltd.). The results are shown in Table 1.
[Evaluation of Lipophilicity]

The glass sample with the cured film, prepared above, was tested using a contact angle meter Drop Master (Kyowa Interface Science Co., Ltd.). The cured film was measured for a contact angle with oleic acid (droplet 2 μL, temperature 25° C., humidity 40% RH) as an index of lipophilicity. The results (contact angle with oleic acid) are shown in Table 1.
Evaluation of Abrasion Resistance
[Evaluation of Rubber Eraser Abrasion Endurance Count]

The glass sample with the cured film, prepared above, was tested using a friction tester (Shinto Scientific Co., Ltd.). The endurance count of rubber eraser abrasion cycles was counted under the following conditions, with the results shown in Table 1.
  Eraser: Rubber stick by Minoan Co.
  Moving distance (one way): 30 mm
  Moving speed: 3,600 mm/min
  Load: 1 kg/6 mm diameter Every 200 rubbing cycles, the cured film on its surface was measured for a contact angle with water. The number of rubbing cycles within which the contact angle with water was kept 500 or more is reported as abrasion endurance count. The count is an average of 8 samples.

TABLE 1

|  | Compound | Fingerprint visibility | Haze (%) | Contact angle with oleic acid (°) | Rubber eraser abrasion endurance count (cycles) |
|---|---|---|---|---|---|
| Example | 1 | 4 | 4 | 6 | 1,950 |
|  | 2 | 4 | 2 | 6 | 2,000 |
|  | 3 | 4 | 3 | 8 | 1,550 |
|  | 4 | 4 | 4 | 7 | 1,700 |
|  | 5 | 4 | 4 | 7 | 1,500 |
|  | 6 | 4 | 4 | 7 | 1,600 |
|  | 7 | 4 | 4 | 6 | 2,250 |
|  | 8 | 4 | 4 | 6 | 2,100 |
|  | 9 | 4 | 4 | 9 | 1,600 |
|  | 10 | 4 | 4 | 8 | 2,100 |
|  | 11 | 4 | 3 | 7 | 2,200 |

<table>
<tr><td>Example</td><td>1</td><td>1</td><td>4</td><td>4</td><td>6</td><td>1,950</td></tr>
<tr><td></td><td>2</td><td>2</td><td>4</td><td>2</td><td>6</td><td>2,000</td></tr>
</table>

TABLE 1-continued

|  | Compound | Fingerprint visibility | Haze (%) | Contact angle with oleic acid (°) | Rubber eraser abrasion endurance count (cycles) |
|---|---|---|---|---|---|
| Comparative Example | 1 | 12 | 4 | 4 | 7 | 1,000 |
| | 2 | 13 | 4 | 5 | 9 | 1,400 |

In all Examples 1 to 11, fingerprints were not visible at all and higher endurance against rubber eraser abrasion was confirmed. By contrast, in Comparative Examples 1 and 2 using compounds containing no flexible siloxane skeleton in the molecule and having only one trialkoxysilyl group, fingerprints were not so conspicuous, but the endurance against rubber eraser abrasion was low.

In the haze measurement by a haze meter, all Examples showed low values of haze, in good correlation to the results of the sensory test.

The invention claimed is:

1. An organosiloxane compound having the general formula (1):

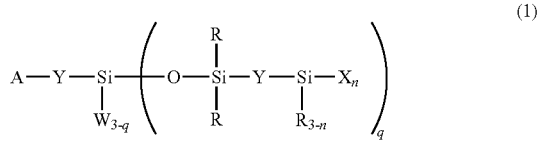

(1)

wherein A is —C(=O)OR$^1$, —C(=O)NR$^1_2$, —C(=O)SR$^1$, or —P(=O)(OR$^1$)$_2$, R$^1$ is hydrogen, a C$_1$-C$_{30}$ alkyl group, C$_6$-C$_{30}$ aryl group, or C$_7$-C$_{30}$ aralkyl group, Y is independently a divalent organic group, W is independently a C$_1$-C$_4$ alkyl group, phenyl group, hydroxyl group or hydrolyzable group, R is independently a C$_1$-C$_4$ alkyl group or phenyl group, X is independently a hydroxyl group or hydrolyzable group, n is an integer of 1 to 3, and q is an integer of 1 to 3.

2. The organosiloxane compound of claim 1, having the general formula (2):

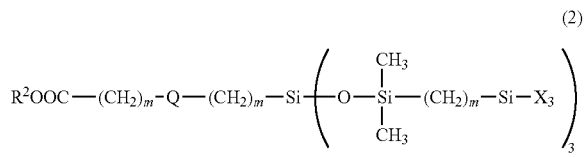

(2)

wherein R$^2$ is a C$_1$-C$_{20}$ alkyl group, C$_6$-C$_{20}$ aryl group or C$_7$-C$_{20}$ aralkyl group, Q is a single bond or a divalent group selected from among silalkylene, silarylene, and straight, branched or cyclic divalent organopolysiloxane residues of 2 to 10 silicon atoms, m is each independently an integer of 1 to 20, and X is independently a hydroxyl group or hydrolyzable group.

3. The organosiloxane compound of claim 1 wherein in formula (1), X is each independently selected from the group consisting of hydroxyl, C$_1$-C$_{10}$ alkoxy, C$_2$-C$_{10}$ alkoxy-substituted alkoxy, C$_1$-C$_{10}$ acyloxy, C$_2$-C$_{10}$ alkenyloxy, halogen, oxime, isocyanate, and cyanate.

4. A surface treating agent comprising the organosiloxane compound of claim 1.

5. The organosiloxane compound of claim 2 wherein in formula (2), X is each independently selected from the group consisting of hydroxyl, C$_1$-C$_{10}$ alkoxy, C$_2$-C$_{10}$ alkoxy-substituted alkoxy, C$_1$-C$_{10}$ acyloxy, C$_2$-C$_{10}$ alkenyloxy, halogen, oxime, isocyanate, and cyanate.

* * * * *